United States Patent
Zhang et al.

(10) Patent No.: US 12,452,729 B2
(45) Date of Patent: Oct. 21, 2025

(54) DATA PROCESSING METHOD, AND COMMUNICATION APPARATUS AND SYSTEM

(71) Applicant: Huawei Technologies Co., Ltd., Guangdong (CN)

(72) Inventors: Hongping Zhang, Shenzhen (CN); Qinghai Zeng, Shanghai (CN); Qufang Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 646 days.

(21) Appl. No.: 17/452,712

(22) Filed: Oct. 28, 2021

(65) Prior Publication Data

US 2022/0053369 A1    Feb. 17, 2022

Related U.S. Application Data

(63) Continuation of application No. PCT/CN2020/087224, filed on Apr. 27, 2020.

(30) Foreign Application Priority Data

Apr. 30, 2019    (CN) .......................... 201910364555.7

(51) Int. Cl.
*H04W 28/06* (2009.01)
*H04W 36/00* (2009.01)
(Continued)

(52) U.S. Cl.
CPC ........ *H04W 28/06* (2013.01); *H04W 36/0011* (2013.01); *H04W 36/0058* (2018.08); *H04W 36/18* (2013.01); *H04W 36/087* (2023.05)

(58) Field of Classification Search
CPC . H04W 28/06; H04W 36/0058; H04W 36/08; H04W 36/18; H04W 36/0011; H04W 36/087; H04L 12/413
See application file for complete search history.

(56) References Cited

U.S. PATENT DOCUMENTS

2011/0058530 A1    3/2011   Kim et al.
2012/0300748 A1*  11/2012   Lindstrom ............ H04W 36/02
                                              370/331
(Continued)

FOREIGN PATENT DOCUMENTS

CN         1655536 A      8/2005
CN       101361343 A      2/2009
(Continued)

OTHER PUBLICATIONS

Gao Zi-long:"A Wireless Link Management Policy Bases on Data Driven",2016,total 5 pages.
(Continued)

*Primary Examiner* — Mandish K Randhawa
(74) *Attorney, Agent, or Firm* — WOMBLE BOND DICKINSON (US) LLP

(57) ABSTRACT

Embodiments of this application provide a data processing method, an access device, and a terminal device. The data communication method includes: A first access network device receives a handover request message from a second access network device, where the handover request message is to request a terminal device to hand over from a cell of the second access network device to a cell of the first access network device. The first access network device determines that robust header compression ROHC restriction processing needs to be performed. The data communication method further includes: The first access network device receives at least one packet from the second access network device and performs the ROHC restriction processing on a second packet in the at least one packet. The method can avoid a decompression failure of a terminal.

15 Claims, 17 Drawing Sheets

(51) Int. Cl.
*H04W 36/18* (2009.01)
*H04W 36/08* (2009.01)

(56) References Cited

U.S. PATENT DOCUMENTS

| | | | |
|---|---|---|---|
| 2013/0064226 | A1 | 3/2013 | Dinan |
| 2013/0315209 | A1 | 11/2013 | Murakami |
| 2014/0328322 | A1 | 11/2014 | Lecompte |
| 2018/0098257 | A1 | 4/2018 | Stattin et al. |
| 2018/0124648 | A1* | 5/2018 | Park .................. H04W 36/0011 |
| 2018/0192337 | A1 | 7/2018 | Ryu et al. |
| 2018/0309660 | A1 | 10/2018 | Loehr et al. |
| 2019/0090156 | A1 | 3/2019 | Kim et al. |
| 2020/0100142 | A1* | 3/2020 | Kim .................... H04W 12/033 |
| 2020/0396655 | A1* | 12/2020 | Wu ..................... H04W 36/083 |
| 2022/0141736 | A1* | 5/2022 | Muller .............. H04W 36/0016 370/331 |

FOREIGN PATENT DOCUMENTS

| | | |
|---|---|---|
| CN | 101389119 A | 3/2009 |
| CN | 101548564 A | 9/2009 |
| CN | 102045132 A | 5/2011 |
| CN | 102131234 A | 7/2011 |
| CN | 102469511 A | 5/2012 |
| CN | 102484643 A | 5/2012 |
| CN | 104518851 A | 4/2015 |
| CN | 104703230 A | 6/2015 |
| CN | 107277879 A | 10/2017 |
| CN | 104067523 B | 3/2018 |
| CN | 108076481 A | 5/2018 |
| CN | 108632229 A | 10/2018 |
| EP | 2947776 A1 | 11/2015 |
| IN | 109644193 A | 4/2019 |
| KR | 20130126844 A | 11/2013 |
| WO | 2008115116 A1 | 9/2008 |
| WO | WO-2008115447 A2 * | 9/2008 ........... H04W 28/06 |
| WO | 2009045945 A2 | 4/2009 |
| WO | 2014119921 A1 | 8/2014 |
| WO | WO-2016095387 A1 * | 6/2016 ............... H04L 1/16 |
| WO | 2018093939 A1 | 5/2018 |
| WO | 2019006582 A1 | 1/2019 |

OTHER PUBLICATIONS

3GPP TSG-RAN WG2 #101,R2-1803858,Corrections to PDCP specification,LG Electronics Inc.,Athens, Greece, Feb. 26, Mar. 2, 2018,total 11 pages.

Intel Corporation, "3GPP TSG RAN WG2 Meeting #104 R2-1816695", Detail for non-split bearer option for simultaneous connectivity, Nov. 1, 2018,total 6 pages.

Wu Ji-Yan End-to-End QoS Guarantee for Delay-Sensitive Mobile Multimedia Conferencing 2013 total 14 pages.

C. Bormann et al., RObust Header Compression (ROHC): Framework and four profiles: RTP, UDP, ESP, and uncompressed. RFC3095, Jul. 2001, 168 pages.

K. Sandlund et al., The RObust Header Compression (ROHC) Framework. RFC5795, Mar. 2010, 41 pages.

3GPP TS 38.423 V15.3.0 (Mar. 2019), 3rd Generation Partnership Project; Technical Specification Group Radio Access Network; NG-RAN; Xn application protocol (XnAP)(Release 15), 294 pages.

3GPP TS 38.323 V15.5.0 (Sep. 2019), 3rd Generation Partnership Project; Technical Specification Group Radio Access Network; NR; Packet Data Convergence Protocol (PDCP) specification (Release 15), 26 pages.

3GPP TS 38.300 V15.5.0 (Mar. 2019), 3rd Generation Partnership Project; Technical Specification Group Radio Access Network; NR; NR and NG-RAN Overall Description; Stage 2(Release 15), 97 pages.

* cited by examiner

DATA PROCESSING METHOD, AND COMMUNICATION APPARATUS AND SYSTEM

CROSS-REFERENCE TO RELATED APPLICATIONS

This application is a continuation of International Application No. PCT/CN2020/087224, filed on Apr. 27, 2020, which claims priority to Chinese Patent Application No. 201910364555.7, filed on Apr. 30, 2019. The disclosures of the aforementioned applications are hereby incorporated by reference in their entireties.

TECHNICAL FIELD

The present invention relates to the field of communication technologies, and in particular, to a data processing method, and a communication apparatus and system.

BACKGROUND

A terminal device usually performs cell handover, for example, handover from a cell of a second access network device to a cell of a first access network device. During the handover of the terminal device, to reduce or avoid interruption, the second access network device duplicates packets received from a core network after allocating sequence numbers to the packets. For one duplicate, the second access network device continues to perform robust header compression (ROHC), and then sends the duplicate to the terminal device. The other duplicate is sent to the first access network device, and the first access network device performs ROHC processing and sends the processed duplicate to the terminal device. After the terminal device accesses the first access network device, the terminal device sends a packet data convergence protocol (PDCP) status report to the first access network device, to indicate, to the first access network device, which packets have been successfully received. After receiving the PDCP status report, the first access network device discards the packets that the terminal device has determined as being successfully received. However, the discarded packets may be initial and refresh (IR) packets that have undergone the ROHC processing, and the IR packets are key content provided by the first access network device for the terminal device to establish a correspondence between context identifiers (context IDs) and compressed content. If the terminal device does not receive the IR packets, the correspondence between compressed content and context IDs is not established. When the first access network device directly sends a compressed packet including a context ID subsequently, the terminal device cannot obtain compressed content corresponding to the context ID. As a result, decompression fails, causing loss of user data packets.

SUMMARY

Embodiments of this application provide a data processing method, an access device, and a terminal device, to avoid a packet loss caused by a decompression failure of the terminal device during handover.

According to a first aspect, an embodiment of this application provides a data processing method, applied to a first access network device side. The method includes: A first access network device receives a handover request message from a second access network device, where the handover request message is used to request a terminal device to hand over from a cell of the second access network device to a cell of the first access network device. A message name of the handover request message may alternatively be a handover command, handover indication information, or the like. This is not limited in this embodiment of this application.

The first access network device receives at least one packet from the second access network device, where the at least one packet may be at least one packet of the terminal device obtained by the second access network device from a core network, and the second access network device sends the at least one packet to the first access network device. Optionally, the at least one packet may be at least one packet of the terminal device that is obtained by the second access network device from the core network, and on which sequence numbering and duplication are performed. For two obtained duplicates, each duplicate includes at least one packet. The second access network device performs ROHC processing on one duplicate and then delivers the duplicate to the terminal device. The second access network device sends the other duplicate to the first access network device, and then the first access network device sends the duplicate to the terminal device.

The first access network device determines a first packet that needs to be discarded in the at least one received packet. The first packet may be a packet successfully received by the terminal device. For example, the first packet is sent by the second access network device to the terminal device. A packet in the at least one packet other than the first packet is a remaining packet. The determining the first packet that needs to be discarded may be that the first access network device discards, based on a PDCP status report sent by the terminal device, the packet that is successfully received by the terminal device.

The first access network device performs ROHC processing on the remaining packet, where the first access network device does not perform ROHC processing before determining the first packet that needs to be discarded. For example, the ROHC processing may be delayed. The ROHC processing starts to be performed on the remaining packet only after the first packet that needs to be discarded is determined.

According to this embodiment of this application, the first access network device performs ROHC processing only after determining the first packet that needs to be discarded. This avoids a problem that the terminal device fails to decompress because the first access network device discards IR packets, and avoids loss of user data packets.

In an embodiment, before the first access network device determines the first packet that needs to be discarded in the at least one packet, the method further includes: The first access network device receives a packet data convergence protocol (PDCP) status report from the terminal device, where the PDCP status report is used to indicate that the terminal device determines a successfully received packet or determines an unsuccessfully received packet.

The first access network device determines, based on the status report, the first packet that needs to be discarded in the received at least one packet. Further, the first access network device may directly discard the determined first packet that needs to be discarded. The first packet may include one or more packets. If there is no packet that needs to be discarded, the first packet includes zero packets.

In an embodiment, the handover request message received by the first access network device from the second access network device may carry first indication information, and the first indication information is used to instruct the first access network device not to perform ROHC processing before determining the first packet that needs to be discarded, or the first indication information is used to indicate that the handover performed by the terminal device is handover with 0 ms interruption. It should be noted that, that the handover performed by the terminal device is handover with 0 ms interruption is indirectly or implicitly indicated. The first access network device may learn, based on the indication information, that the ROHC processing does not need to be performed before determining the first packet that needs to be discarded.

Correspondingly, the second access network device sends the handover request message to the first access network device, where the handover request message may carry the first indication information, and the first indication information is used to instruct the first access network device not to perform ROHC processing before determining the first packet that needs to be discarded, or the first indication information is used to indicate that the handover performed by the terminal device is handover with 0 ms interruption.

According to a second aspect, an embodiment of this application provides a data processing method, applied to a first access network device side. The method includes: A first access network device receives a handover request message from a second access network device, where the handover request message is used to request a terminal device to hand over from a cell of the second access network device to a cell of the first access network device.

The first access network device determines that ROHC restriction processing needs to be performed, where the ROHC restriction processing includes: performing no header compression, generating only initial and refresh (IR) packets, or performing processing in an R mode.

The performing no header compression may be that the first access network device generates an uncompressed packet in a specific format. For example, the first access network device first sends IR packets, a value of a profile ID in the IR packet is a specific value, and the specific value is 0x0000, indicating no compression. Subsequently, the first access network device may send an uncompressed packet in a specific format, for example, an uncompressed packet that may include a context ID but does not include a profile ID.

The first access network device receives at least one packet from the second access network device, and performs ROHC restriction processing on a second packet in the at least one packet, where the second packet may be a part of the at least one packet. The second packet may include one or more packets.

The first access network device determines a third packet that needs to be discarded in the at least one packet, where the third packet is a packet successfully received by the terminal device. It should be noted that the third packet may include one or more packets. The third packet may include the second packet, the second packet may include the third packet, or the second packet is the same as the third packet. This is not limited in this embodiment of this application.

The first access network device cancels the ROHC restriction processing after determining the third packet that needs to be discarded. If the ROHC restriction processing includes performing no header compression, or generating only initial and refresh (IR) packets, canceling the ROHC restriction processing may be resetting an ROHC layer of the first access network device to an initial state. If the ROHC restriction processing includes performing processing in an R mode, canceling the ROHC restriction processing may be performing processing in another mode, where the another mode may be any one of an R mode, a U mode, and an O mode.

In this embodiment of this application, the ROHC restriction processing is performed before the third packet that needs to be discarded is determined, to avoid problems of a decompression failure and packet loss caused because the terminal device cannot identify a compressed packet when the IR packets are discarded during the discarding.

In an embodiment, after the first access network device cancels the ROHC restriction processing, the first access network device performs ROHC processing on a packet in the at least one received packet other than the second packet and the third packet. That is, the first access network device performs ROHC processing only on a packet that the terminal device has determined as not being received and on which ROHC restriction processing is not performed, to avoid repeatedly processing the packet, thereby improving processing efficiency.

In an embodiment, a PDCP protocol layer of the first access network device indicates the ROHC protocol layer to perform the ROHC restriction processing.

In an embodiment, before the first access network device determines the third packet that needs to be discarded in the at least one packet, the first access network device receives a PDCP status report from the terminal device, where the PDCP status report is used to indicate that the terminal device determines a successfully received packet or determines an unsuccessfully received packet.

The first access network device determines, based on the PDCP status report, the third packet that needs to be discarded in the at least one packet.

In an embodiment, the handover request message received by the first access network device from the second access network device comprises second indication information, and the second indication information is used to instruct the first access network device to perform the ROHC restriction processing before determining the third packet that needs to be discarded, or the second indication information indirectly indicates that the handover performed by the terminal device is handover with 0 ms interruption.

Correspondingly, the second access network device sends the handover request message to the first access network device, where the handover request message may comprise the second indication information, and the second indication information is used to instruct the first access network device to perform the ROHC restriction processing before determining the third packet that needs to be discarded, or the second indication information indirectly indicates that the handover performed by the terminal device is handover with 0 ms interruption.

According to a third aspect, an embodiment of this application provides a data processing method, applied to a first access network device side. The method includes: A first access network device receives a handover request message from a second access network device, where the handover request message is used to request a terminal device to hand over from a cell of the second access network device to a cell of the first access network device.

The first access network device receives at least one packet from the second access network device, and performs ROHC processing on the at least one packet, where the at least one packet may be a packet obtained by the second access network device through duplication.

The first access network device receives a PDCP status report from the terminal device, where the PDCP status report is used to indicate that the terminal device determines a successfully received packet or determines an unsuccessfully received packet.

To prevent the first access network device from discarding IR packets, the first access network device ignores the PDCP status report. The ignoring may be that the PDCP status report is not processed, or the PDCP status report is discarded.

According to this embodiment of this application, after receiving the PDCP status report, the first access network device ignores the PDCP status report and does not discard a packet, and therefore the IR packets are not discarded. This avoids a decompression failure of the terminal device.

In an embodiment, the handover request message received by the first access network device from the second access network device may carry third indication information, and the third indication information is used to instruct the first access network device to ignore the PDCP status report received from the terminal device, or the third indication information is used to indicate that the handover performed by the terminal device is handover with 0 ms interruption.

Correspondingly, the second access network device sends the handover request message to the first access network device, where the handover request message may carry the third indication information, and the third indication information is used to instruct the first access network device to ignore the PDCP status report received from the terminal device, or the third indication information is used to indicate that the handover performed by the terminal device is handover with 0 ms interruption.

According to a fourth aspect, an embodiment of this application provides a data processing method, applied to a terminal device side. The method includes: A terminal device receives a handover command message from a second access network device, where the handover command message is used to instruct the terminal device to hand over from a cell of the second access network device to a cell of a first access network device, the handover command message carries fourth indication information, and the fourth indication information is used to indicate that the handover performed by the terminal device is handover with 0 ms interruption, or indicate that the second access network device duplicates, during the handover, user data to the first access network device for sending. It should be noted that a message name of the handover command message may be handover indication information, handover information, or the like. This is not limited in this embodiment of this application.

The terminal device determines, based on the fourth indication information, not to send a packet data convergence protocol (PDCP) status report to the first access network device, where the PDCP status report is used to indicate that the terminal device determines a successfully received packet or determines an unsuccessfully received packet.

According to this embodiment of this application, because the terminal device does not send the PDCP status report to the first access network device, the first access network device does not discard a packet, and therefore IR packets are not discarded. This avoids a decompression failure of the terminal device.

Correspondingly, the first access network device receives a handover request message from the second access network device, where the handover request message is used to request the terminal device to hand over from the cell of the second access network device to the cell of the first access network device.

The first access network device receives at least one packet from the second access network device, and performs ROHC processing on the at least one packet, where the at least one packet may be a packet obtained by the second access network device through duplication.

Because the first access network device does not receive the PDCP status report sent by the terminal device, the first access network device does not determine a packet that needs to be discarded in the at least one packet, but performs ROHC processing on each packet and sends a processed packet to the terminal device.

According to a fifth aspect, an embodiment of this application provides a communication apparatus. The communication apparatus may be a first access network device or a component (circuit or chip) that may be used in the first access network device, and the communication apparatus may include a plurality of functional modules or units, configured to correspondingly perform the data processing method according to any one of the first aspect to the third aspect.

According to a sixth aspect, an embodiment of this application provides a communication apparatus. The communication apparatus may be a terminal device or a component (a circuit or a chip) that may be used in the terminal device. The communication apparatus may include a plurality of functional modules or units, configured to correspondingly perform the data processing method according to the fourth aspect.

According to a seventh aspect, an embodiment of this application provides a communication apparatus. The communication apparatus may be a first access network device or a component (circuit or chip) that may be used in the first access network device. The communication apparatus may include a memory, a processor, a transmitter, and a receiver. The transmitter and the receiver are configured to communicate with another communication device (for example, a terminal device or a second access network device). The memory is configured to store code for implementation of the data processing method according to any one of the first aspect to the third aspect, and the processor is configured to execute the program code stored in the memory, that is, perform the data processing methods according to the corresponding aspects.

According to an eighth aspect, an embodiment of this application provides a communication apparatus. The communication apparatus is a terminal device or a component (a circuit or a chip) that may be used in the terminal device, and the terminal device is configured to perform the data processing method according to the fourth aspect. The terminal device may include a memory, a processor, a transmitter, and a receiver. The transmitter and the receiver are configured to communicate with another communication device (for example, a first access network device or a second access network device). The memory is configured to store code for implementation of the data processing method according to the fourth aspect, and the processor is configured to execute the program code stored in the memory, that is, perform the data processing method according to the fourth aspect.

According to a ninth aspect, an embodiment of this application provides a communication chip. The communication chip may include a processor and one or more interfaces coupled to the processor. The processor may be configured to invoke, from a memory, a program for implementation of the data processing method according to any one of the first aspect to the fourth aspect, and execute instructions included in the program. The interface may be configured to output a data processing result of the processor.

According to a tenth aspect, an embodiment of this application provides a computer-readable storage medium, where the readable storage medium stores instructions. When the instructions are run on a processor, the processor is enabled to perform the data processing method described in any one of the first aspect to the fourth aspect.

According to an eleventh aspect, an embodiment of this application provides a computer program product including instructions. When the computer program product runs on a processor, the processor is enabled to perform the data processing method described in any one of the first aspect to the fourth aspect.

BRIEF DESCRIPTION OF DRAWINGS

To describe the technical solutions in the embodiments of this application or in the background more clearly, the following describes the accompanying drawings for describing the embodiments of this application or the background.

DESCRIPTION OF EMBODIMENTS

Figure 1:
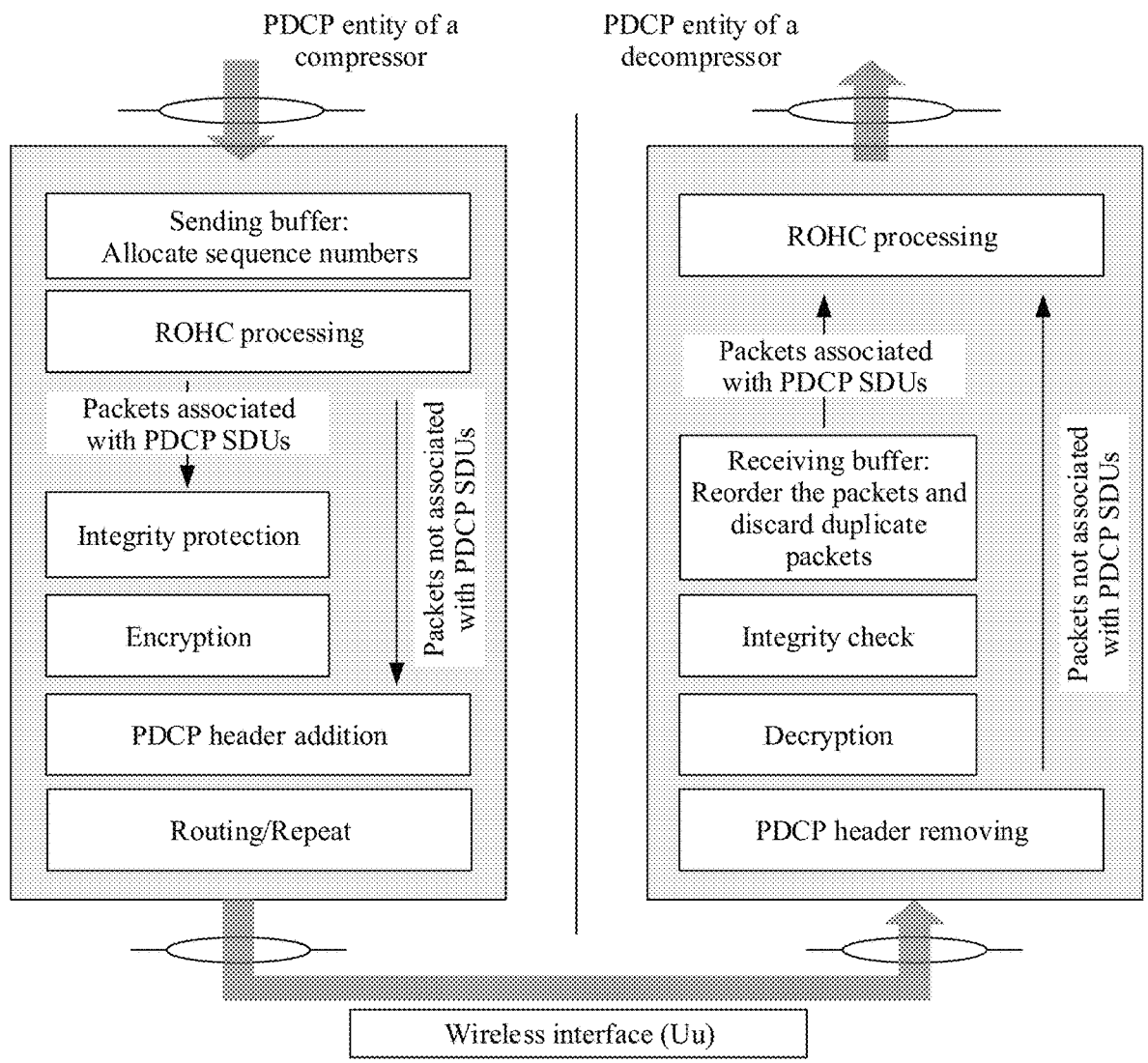
FIG. 1 is a schematic diagram of a protocol stack according to an embodiment of this application.

A first access network device in the embodiments of this application may be an access network device in a cell in which the terminal device is located after the terminal device is handed over, for example, may be a target base station to which the terminal device is handed over.

A second access network device in the embodiments of this application may be an access network device in a cell in which the terminal device is located before the terminal device is handed over, for example, may be a source base station before the terminal device is handed over to.

A packet in the embodiments of this application may be a PDCP SDU. To be specific, ROHC processing may be performed on the PDCP SDU.

The following describes an ROHC processing mechanism in the embodiments of this application. It should be noted that in the embodiments of this application, the first access network device mainly relates to an ROHC processing procedure at a compressor, and the terminal device mainly relates to an ROHC processing procedure at a decompressor.

To effectively improve utilization of a limited quantity of radio resources, a radio packet header needs to be compressed. The Internet Engineering Task Force (IETF) proposed a robust header compression protocol in 2001, in which a high compression rate and better error-resistance robustness can be achieved.

Headers can be compressed mainly because there is redundant information in header fields of a plurality of packets, for example, a source IP address and a destination IP address in an IP header. The ultimate purpose of ROHC header compression is to eliminate the redundant information in the headers, to complete header compression.

To distinguish between different compressed content, a context identifier (Context ID) is introduced in an ROHC protocol for distinguishing. To be specific, unique context IDs are allocated to different compressed content. For example, compressed content in a header is 20 "1"s, and an allocated context ID is 10. If a plurality of packet headers each include 20 "1"s, corresponding context IDs are all 10.

In addition, to compress headers of a plurality of types of protocols, the concept of a profile (Profile) is introduced in the ROHC protocol. A unique correspondence between profile IDs and headers is defined in the ROHC protocol based on headers of different types of protocols. For example, an IP/TCP profile ID is 0x0006. The following describes common profiles, where the profiles include values of profile IDs corresponding to various types of protocols.

| Header of a type of protocol | Profile ID |
|---|---|
| UNCOMPRESSOR (Uncompressor) | 0x0000 |
| IP/UDP/RTP | 0X0001 |
| IP/UDP | 0X0002 |
| IP/ESP | 0X0003 |
| IP | 0X0004 |
| IP/TCP | 0X0006 |
| IP_UDP LITE | 0X0008 |

To enable a decompressor to first establish a correspondence between context IDs and compressed content, a compressor needs to first send IR packets to the decompressor, where the IR packets include allocated context IDs, corresponding profile IDs, and complete packets (that is, packets that are not compressed). The complete packets include compressed content corresponding to the context IDs. After receiving the IR packets, the decompressor parses the IR packets, and establishes a correspondence between the context IDs, the profile IDs, and the compressed content corresponding to the context IDs.

Because the decompressor has successfully established the correspondence between the context IDs, the compressed content, and the profile IDs, to reduce overheads, the compressor may directly send a compressed packet that includes a context ID subsequently, where the compressed packet does not include compressed content. After receiving a subsequent compressed packet, the decompressor may perform decompression processing on the compressed packet based on the stored correspondence between the context IDs, compressed contents, and the profile IDs.

It can be learned from the foregoing that only when the decompressor successfully establishes the correspondence between the context IDs and compressed content, a compressed packet carrying a corresponding context ID can be successfully decompressed; otherwise, decompression fails. However, because the compressor changes from sending an IR packet to sending a compressed packet, three working modes, namely, a U mode, an R mode, and an O mode, are defined in the ROHC protocol.

In the R mode, only after receiving feedback sent by the decompressor (where the feedback is used to confirm that the decompressor has successfully established a correspondence between context IDs and compressed content), the compressor can compress a subsequent header carrying same compressed content; otherwise, a packet with a header carrying the compressed content is still sent in a form of an IR packet.

The U mode is selected when an ROHC system does not have or cannot use feedback. The decompressor cannot send feedback to the compressor. As long as the compressor consecutively sends n IR packets that include a same context ID, same compressed content, and a same profile ID (that is, an optimistic approximation method), the compressor considers that the decompressor has successfully established a correspondence between context IDs and compressed content. The compressor sends a compressed packet including a context ID.

In the O mode, the compressor considers, according to optimistic approximation or when receiving feedback, that the decompressor has successfully established a correspondence between context IDs and compressed content, and sends a compressed packet that includes a context ID. The O mode is selected when the ROHC system has an available feedback.

In a current new radio (NR) (5G) system, a PDCP layer (serving as a sender) is responsible for performing ROHC header compression on user data (that is, a PDCP SDU) submitted by an upper layer and the PDCP layer (serving as a receiver) is responsible for performing ROHC header decompression on a PDCP PDU submitted by a lower layer. FIG. 1 is a schematic diagram of a protocol stack between a compressor and a decompressor according to an embodiment of this application. As shown in the figure, a PDCP entity of the compressor stores user data (that is, a PDCP SDU) submitted by an upper layer into a sending buffer, and allocates a sequence number; then, performs ROHC header compression processing, and further performs integrity protection, encryption, PDCP header addition, and routing processing on the packet on which ROHC header compression is performed; and sends the packet to a radio link layer. The packet is sent to the decompressor through a radio interface. The decompressor removes a PDCP header, decrypts the packet, performs integrity protection, reorders packets according to sequence numbers, discards a duplicate packet, and further performs ROHC header decompression, to obtain the user data.

Figure 2:
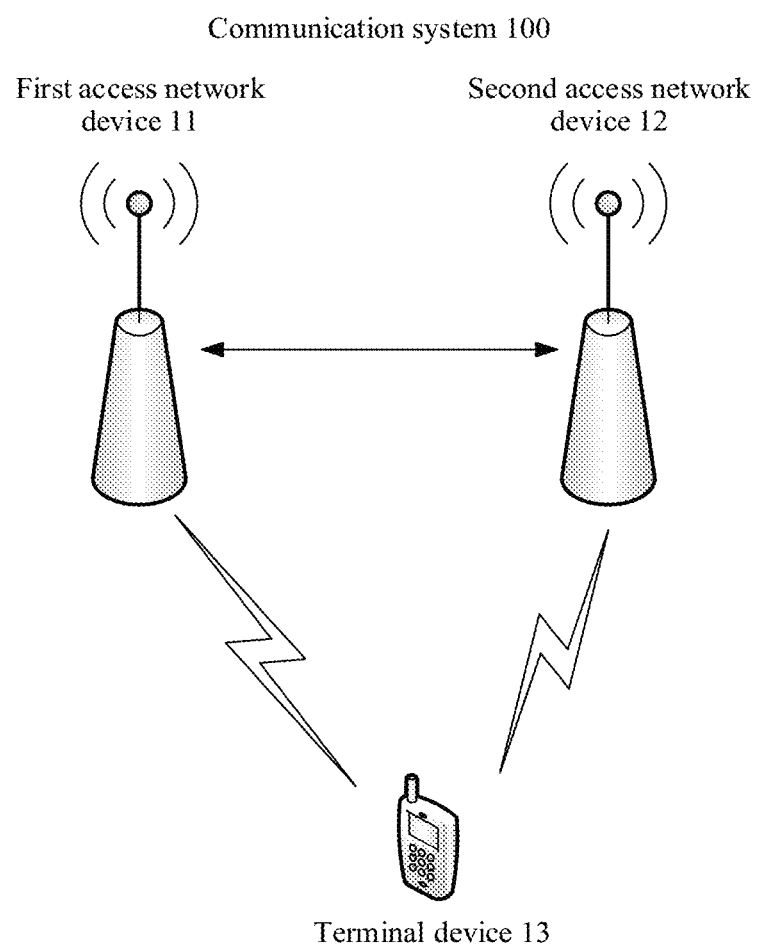
FIG. 2 is a diagram of a system architecture according to an embodiment of this application.

FIG. 2 is a schematic diagram of an architecture of a wireless communication system according to an embodiment of this application. The wireless communication system 100 includes a first access network device 11, a second access network device 12, and a terminal device 13.

The terminal device 13 may also be referred to as user equipment, a mobile station, an access terminal, a subscriber unit, a subscriber station, a remote station, a remote terminal, a mobile device, a user terminal, a terminal, a wireless communication device, a user agent, a user apparatus, or the like. The terminal device may be handheld user equipment, a notebook computer, a subscriber unit, a cellular phone, a smartphone, a wireless data card, a personal digital assistant (personal digital assistant, PDA), a handheld device, a vehicle-mounted device, or a wearable device having a wireless communication function, a mobile station in a future 5G network, user equipment in a future evolved public land mobile network (PLMN), or the like. The terminal device 13 communicates with the first access network device 11 and the second access network device 12 by using an air interface technology.

The first access network device 11 and the second access network device 12 in this embodiment of this application may include network devices in various forms, for example, a macro base station, a micro base station (also referred to as a small cell), a relay station, an access point, or a cell. For example, a base station may be an evolved NodeB (eNB), and a next-generation NodeB (gNB) in a 5G system or a new radio (NR) system. In addition, the base station may alternatively be a transmission reception point (TRP), a central unit (CU), or another network entity. In addition, in a distributed base station scenario, the first access network device 11 and the second access network device 12 may be a baseband processing unit (BBU) and a remote radio unit (RRU). In a cloud radio access network (CRAN) scenario, the first access network device 11 and the second access network device 12 may be a baseband unit pool BBU pool and a remote radio unit RRU. In addition, the first access network device 11 and the second access network device 12 may alternatively be a mobility management entity (MME) device, an access and mobility management function (AMF) device, or an internet of vehicles control function (CF) device, a gateway, a roadside unit (RSU), an operation administration and maintenance (OAM) device, an application server, or a third-party network element.

Figure 3:
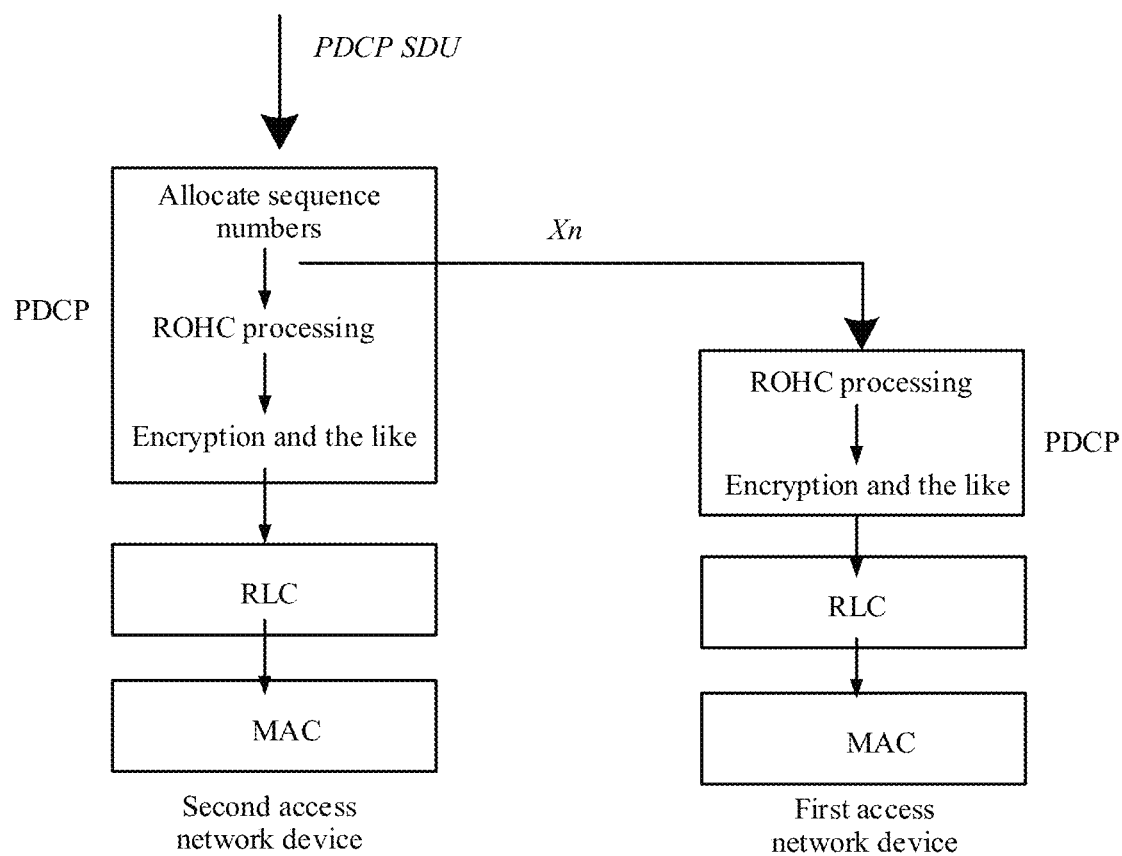
FIG. 3 is a schematic diagram of ROHC processing on a packet according to an embodiment of this application.

The terminal device may perform cell handover, for example, handover from a cell of the second access network device 12 to a cell of the first access network device 11. During network handover, the terminal device disconnects a wireless connection to the second access network device 12, and re-establishes a network connection to the first access network device 11. To reduce or avoid interruption, a method is that the second access network device duplicates a packet received from a core network after allocating a sequence number to the packet. The packet may be a packet data convergence protocol (PDCP) service data unit (SDU). As shown in FIG. 3, after the second access network device 12 allocates a sequence number to a received PDCP SDU at a PDCP layer of the second access network device, the second access network device 12 duplicates the PDCP SDU. For one duplicate PDCP SDU, the second access network device 12 continues to perform ROHC processing at the PDCP layer of the second access network device, and sends the duplicate PDCP SDU to the terminal device. The other duplicate PDCP SDU is sent to a PDCP layer of the first access network device through an interface between the access network devices. The PDCP layer of the first access network device performs ROHC processing on the PDCP SDU received from the second access network device, and sends the PDCP SDU to the terminal device. It should be noted that, correspondences between context IDs and compressed content that are established by the first access network device and the second access network device when performing ROHC processing on the packet are independent of each other. To be specific, for same compressed content, context IDs allocated by the first access network device and the second access network device may be different. Therefore, the terminal device cannot decompress a compressed packet of the first access network device based on the correspondence between context IDs and compressed content that is established for IR packets received from the second access network device.

After completing access to the first access network device, the terminal device sends a PDCP status report to the first access network device, to indicate, to the first access network device, specific PDCP PDUs that the terminal device has determined as being received. The packets that the terminal device has determined as being received may be received from the second access network device. Further, after receiving the PDCP status report, the first access network device discards a PDCP PDU that the terminal device has determined as being received.

However, because the first access network device obtains a PDCP SDU obtained through duplication by the second access network device, and immediately performs ROHC protocol processing, if the first access network device performs processing in the U mode, that is, the first access network device processes a preset quantity of IR packets (for example, three IR packets), and the IR packets include context IDs allocated to compressed content and the compressed content, the first access network device considers that the terminal device has established a correspondence between context IDs and compressed content, and then sends a compressed packet including a context ID. However, the discarded packet may be an IR packet obtained after the ROHC protocol processing. Because the IR packet is discarded, the terminal device cannot establish the correspondence between context IDs and compressed content, and therefore, ROHC decompression of a subsequent compressed packet may fail, causing loss of user data packets.

Figure 4:
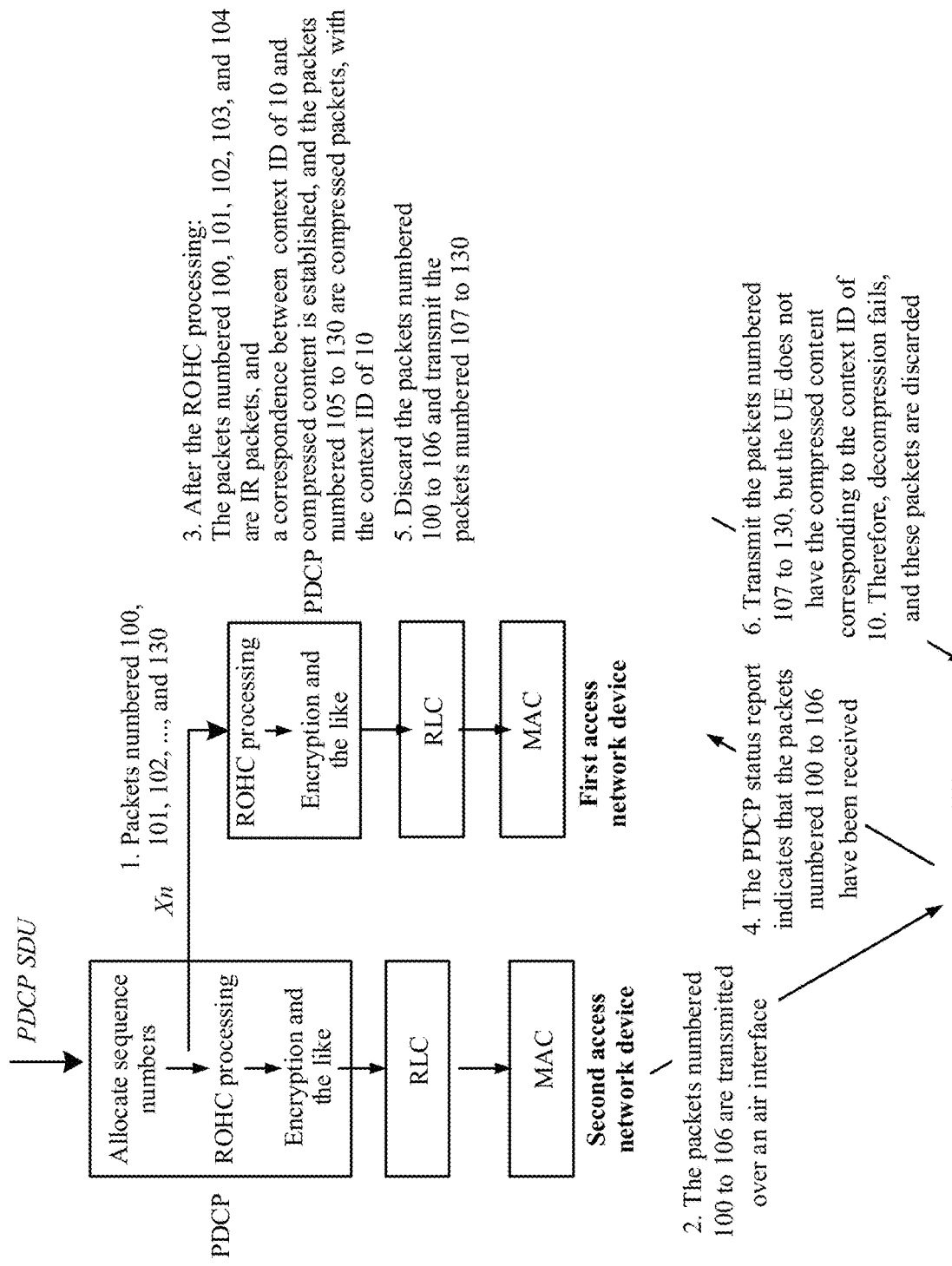
FIG. 4 is a schematic diagram of ROHC processing in a conventional technology according to an embodiment of this application.

FIG. 4 is a schematic diagram of an application scenario according to an embodiment of this application. As shown in the FIGS. 1, 2, 3, 4, 5, and 6 are used to indicate an execution sequence. During handover of the terminal device, the second access network device allocates sequence numbered 100 to 130 to packets, duplicates the packets and sends the packets to the first access network device through an Xn interface. The second access network device successfully transmits the packets 100 to 106 to the UE. However, after the first access network device performs ROHC protocol processing on these packets, the packets numbered 100 to 104 are encapsulated into IR packets that are used by the terminal device to establish a correspondence between a context ID of 10 and compressed content, and the packets numbered 105 to 130 are compressed into compressed packets, to be specific, the compressed packets include context IDs, but do not include compressed content. The UE sends a PDCP status report to the first access network device, to indicate that the packets numbered 100 to 106 have been determined as being received, and the second access network device discards the packets numbered 100 to 106, and sends the packets numbered 107 to 130 to the UE. When the UE decompresses the packets numbered 107 to 130, because the packets numbered 100 to 104 are not received, the correspondence between a context ID of 10 and compressed content is not established. Therefore, the decompression fails, and the packets numbered 107 to 130 are discarded. As a result, user data is lost.

The embodiments of this application provide the embodiments in FIG. 5 to FIG. 14 to resolve the foregoing technical problem of the decompression failure. For technical details, refer to descriptions in the embodiments in FIG. 5 to FIG. 14. Details are not described herein again.

It should be noted that the communication system 100 shown in FIG. 2 is merely intended to more clearly describe the technical solutions in this application, but is not intended to limit this application. A person of ordinary skill in the art may know that as a network architecture evolves and a new service scenario emerges, the technical solutions provided in this application are also applicable to a similar technical problem.

Figure 5:
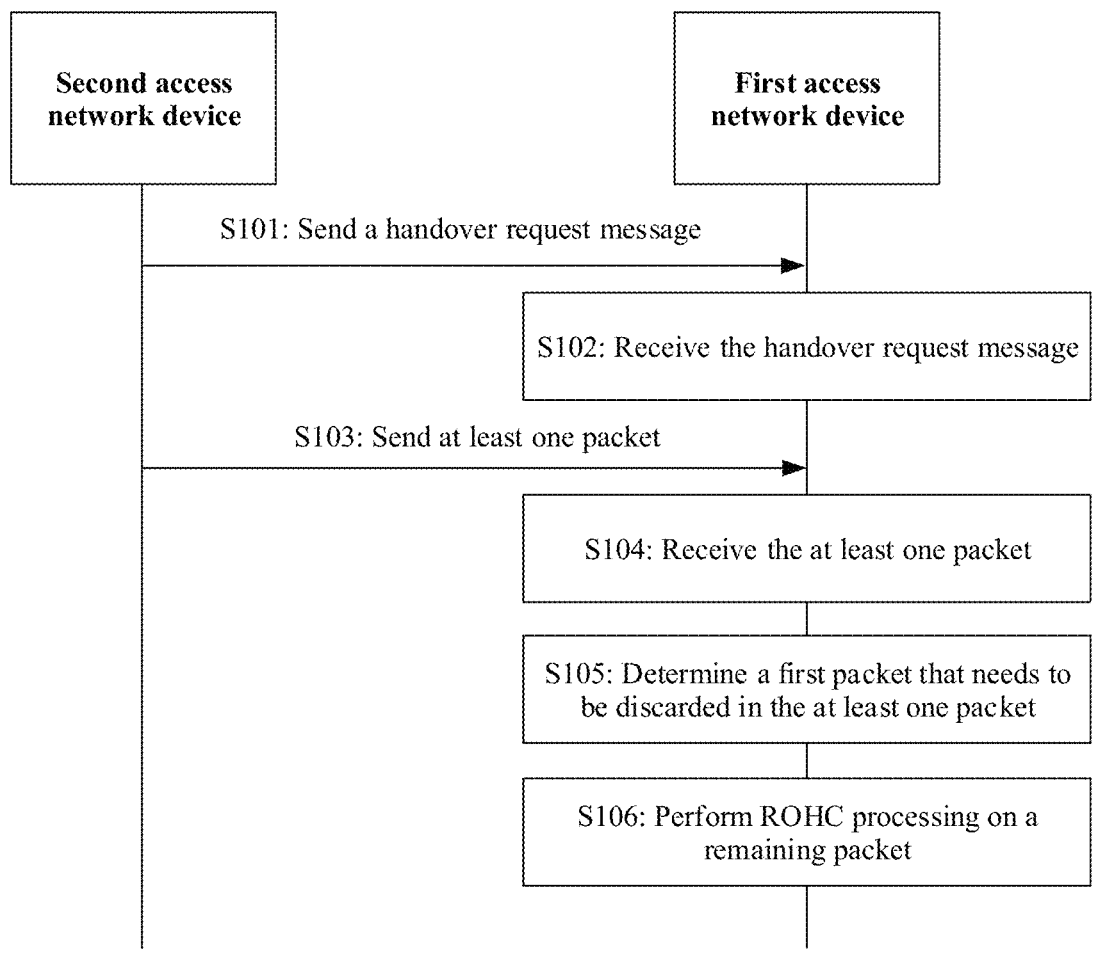
FIG. 5 is a flowchart of a data processing method according to an embodiment of this application.

Based on the devices in the wireless communication system 100, an embodiment of this application provides a packet processing method. As shown in FIG. 5, the method includes but is not limited to the following operations.

S101: A second access network device sends a handover request message to a first access network device, where the handover request message is used to request a terminal device to hand over from a cell of the second access network device to a cell of the first access network device.

S102: The first access network device receives the handover request message from the second access network device.

S103: The second access network device sends at least one packet to the first access network device.

S104: The first access network device receives the at least one packet from the second access network device.

In an embodiment, the terminal device may perform cell handover. For example, the terminal device may be handed over from the cell of the second access network device to the cell of the first access network device. The second access network device sends the handover request message to the first access network device, where the handover request message is used to request the terminal device to hand over from the cell of the second access network device to the cell of the first access network device. The first access network device receives the handover request message sent by the second access network device, and parses the handover request message, to learn that the terminal device needs to hand over from the cell of the second access network device to the cell of the first access network device. It should be noted that the handover request message may have another message name. For example, the handover request message may be a handover command, a handover request, or the like. This is not limited in this embodiment of this application.

To avoid interruption during the handover, after determining that the terminal device needs to perform cell handover, the second access network device sends the at least one packet of the terminal device to the first access network device. Optionally, the at least one packet may be obtained after the second access network device duplicates a packet that is of the terminal device and that is obtained from a core network. For example, before the handover, the second access network device obtains packets of the terminal device from the core network. When determining that the terminal device needs to hand over from the cell of the second access network device to the cell of the first access network device, the second access network device duplicates the packets of the terminal device, and then performs sequence numbering, for example, by using Arabic numerals, for example, 100 to 130, and finally, duplicates the numbered packets to obtain two duplicate packets in total, where each duplicate packet includes at least one packet, and quantities of packets in the two duplicate packets are the same. For example, each duplicate packet includes 31 packets. One duplicate packet is delivered to the terminal device by the second access network device, and the other duplicate packet is sent to the terminal device by the first access network device.

S105: The first access network device determines a first packet that needs to be discarded in the at least one packet, where the first packet is a packet successfully received by the terminal device, and a packet in the at least one packet other than the first packet is a remaining packet.

In an embodiment, when the terminal device is handed over from the cell of the second access network device to the cell of the first access network device, before the terminal device disconnects a network connection to the second access network device, the terminal device may receive a packet sent by the second access network device. After the terminal device establishes a network connection to the first access network device, the terminal device may receive a packet sent by the first access network device. To avoid a waste of air interface radio resources caused by repeated transmissions, after establishing the network connection to the first access network device, the terminal device sends a PDCP status report to the first access network device, where the PDCP status report is used to indicate that the terminal device determines a successfully received packet or determines an unsuccessfully received packet. In this way, after receiving the PDCP status report, the first access network device determines the first packet that needs to be discarded in the at least one packet received from the second access network device. It should be noted that the packet that the terminal device has determined as being successfully received may be a packet sent by the second access network device to the terminal device before the second access network device disconnects the network connection to the terminal device. Alternatively, the packet that the terminal device has determined as being successfully received may include a packet sent by the second access network device to the terminal device before the second access network device disconnects the network connection to the terminal device, and a packet sent by the first access network device to the terminal device after the first access network device establishes the network connection to the terminal device. This is not limited in this embodiment of this application.

The first access network device determines, based on the PDCP status report, the first packet that needs to be discarded in the at least one packet, where the first packet is a packet successfully received by the terminal device. The first packet may include one or more packets. If there is no packet that needs to be discarded, the first packet includes zero packets. The packet in the at least one packet other than the first packet is the remaining packet. It should be noted that the first access network device may determine the remaining packet based on the PDCP status report. For example, the at least one packet is numbered 100 to 130. If the PDCP status report indicates that the packets numbered 100 to 106 have been successfully received by the terminal device, the first access network device may determine that the remaining packets are the packets numbered 107 to 130.

S106: The first access network device performs robust header compression (ROHC) processing on the remaining packet, where the first access network device does not perform ROHC processing before determining the first packet that needs to be discarded.

In an embodiment, the first access network device performs ROHC processing on the remaining packet. It should be noted that the ROHC processing includes allocating a context identifier (context ID) to compressed content in a header, and generating IR packets that include context IDs, profile IDs, and compressed content. After the first access network device determines that the terminal device establishes a correspondence between context IDs and compressed content, the first access network device sends a compressed packet that includes a context ID but does not include compressed content. A determining manner in which the first access network device determines that the terminal device establishes the correspondence between context IDs and compressed content may be that if the first access network device a preset quantity of IR packets to the terminal device, the first access network device considers that the terminal device establishes the correspondence between context IDs and compressed content.

When the first access network device determines, based on the PDCP status report, the packet that needs to be discarded, to prevent the first access network device from mistakenly discarding the IR packet that is generated by the first access network device and used by the terminal device to establish the correspondence between context IDs and compressed content, in this embodiment of this application, before determining the first packet that needs to be discarded, the first access network device does not perform ROHC processing, that is, delays performing ROHC processing. After receiving the at least one packet forwarded by the second access network device, the first access network device waits for the PDCP status report sent by the terminal device to the first access network device, and determines, based on the PDCP status report before starting to perform ROHC processing, the first packet that needs to be discarded in the at least one packet.

Optionally, that the first access network device delays performing ROHC processing may be: For example, after the first access network device receives the handover request message, a PDCP layer indicates an ROHC layer not to perform ROHC processing before determining the first packet that needs to be discarded; or after the first access network device determines the first packet that needs to be discarded, a PDCP layer hands over the remaining packet to an ROHC layer for ROHC processing, that is, the PDCP layer of the first access network device does not hand over the packet to the ROHC layer before discarding the first packet.

Optionally, that the first access network device delays performing ROHC processing may be that the first access network device delays performing PDCP processing. Because ROHC processing is performed as indicated by the PDCP layer, delaying performing PDCP processing is equivalent to delaying performing ROHC processing.

Optionally, the second access network device may indicate the first access network device to delay performing ROHC processing. For example, the handover request message sent by the second access network device to the first access network device carries first indication information, where the first indication information is used to instruct the terminal device to perform handover with 0 ms interruption, or the first indication information is used to instruct the first access network device not to perform ROHC processing before determining the first packet that needs to be discarded. It should be noted that, indicating that the handover performed by the terminal device is handover with 0 ms interruption is indirectly indicating the first access network device not to perform ROHC processing before determining the first packet that needs to be discarded, where indication manners are different. When the first access network device receives the handover request message that includes the first indication information used to indicate that the handover performed by the terminal device is handover with 0 ms interruption, the first access network device learns that ROHC processing is not performed before determining the first packet that needs to be discarded.

Figure 6:
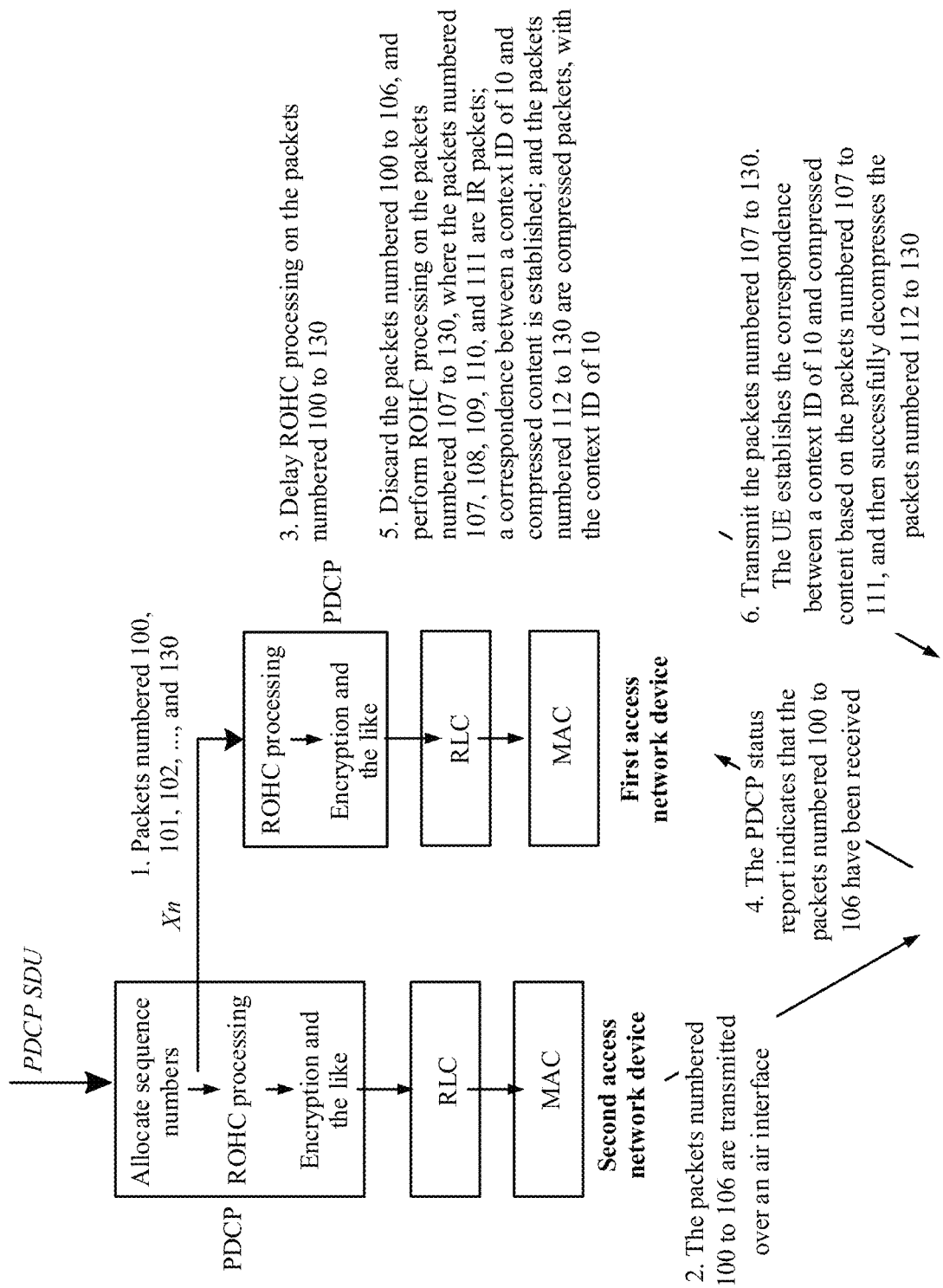
FIG. 6 is a schematic diagram of processing a packet on a protocol stack according to an embodiment of this application.

FIG. 6 is a schematic diagram of delaying ROHC processing according to an embodiment of this application. As shown in the figure, the second access network device duplicates packets numbered 100 to 130, sends one duplicate packet to the PDCP layer of the first access network device for ROHC processing, and sends the other duplicate packet to a PDCP layer of the second access network device for ROHC processing. For example, the packets numbered 100 to 106 are sent to the terminal device by the second access network device. After receiving the packets numbered 100 to 130, the first access network device delays performing ROHC processing, that is, does not perform ROHC processing. The terminal device sends a PDCP status report to the first access network device, to indicate that the packets numbered 100 to 106 are successfully received. The first access network device discards the packets numbered 100 to 106, and performs ROHC processing on the packets numbered 107 to 130. After the ROHC processing, the packets numbered 107 to 111 are IR packets, and are used to establish a correspondence between context IDs and compressed content, and the packets numbered 112 to 130 are compressed packets. Because the IR packets are not discarded, the terminal device can also successfully decompress a subsequent compressed packet.

According to this embodiment of this application, the first access network device performs ROHC processing only after determining the first packet that needs to be discarded in the at least one received packet. In other words, the IR packets are not generated in advance. This avoids discarding of the IR packets, and avoids a decompression failure of the terminal device.

Figure 7:
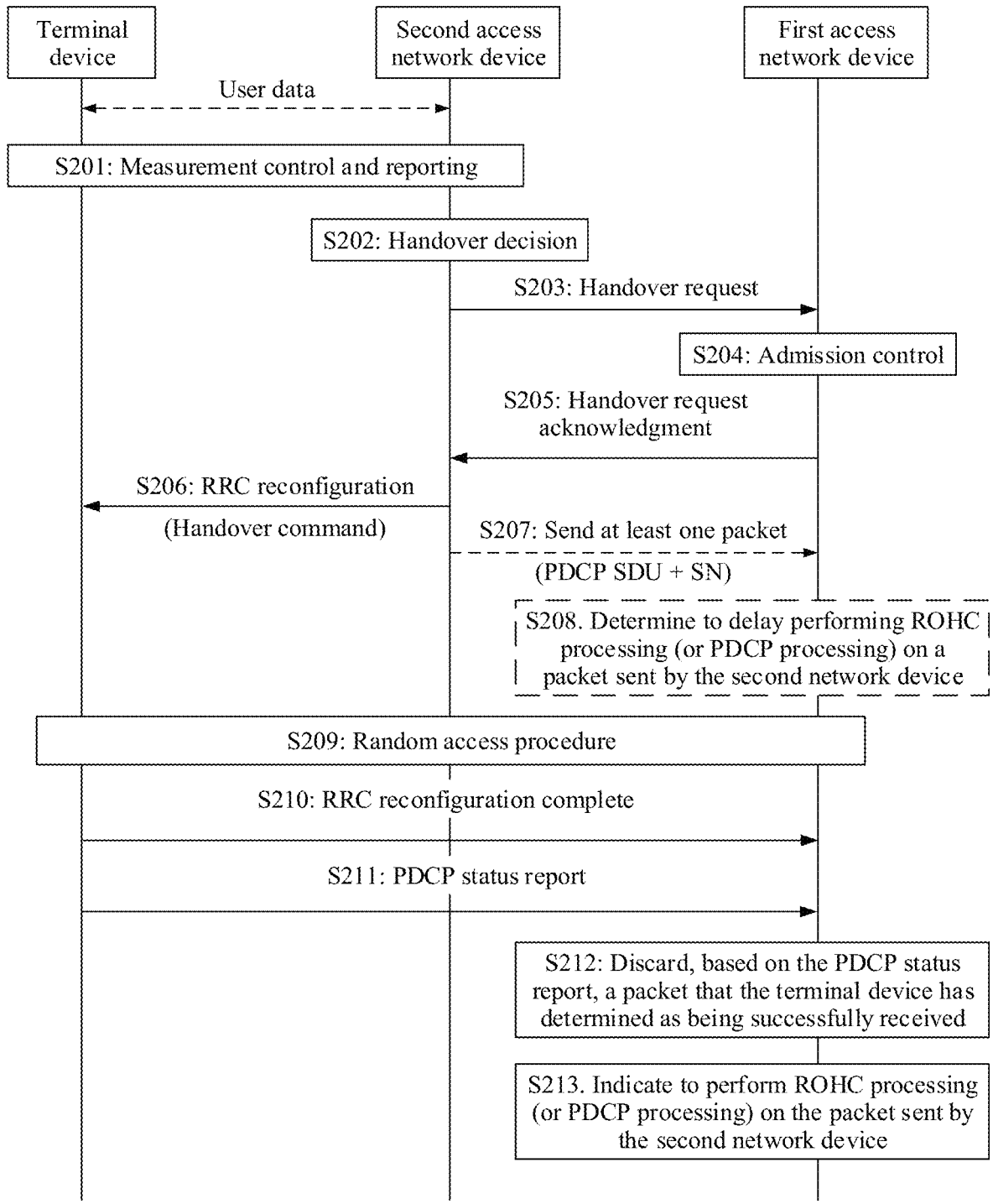
FIG. 7 is an interaction diagram of a data processing method in an application scenario according to an embodiment of this application.

Based on the descriptions in the embodiment in FIG. 5, FIG. 7 is a technical implementation in a specific application scenario according to an embodiment of this application. The technical implementation includes the following operations.

S201: When a terminal device needs to hand over from a cell of a second access network device to a cell of a first access network device, the second access network device and the terminal device performs measurement control and reporting.

Before operation S201, the second access network device and the terminal device establish a network connection, and transmit user data.

S202: The second access network device makes a handover decision.

S203: The second access network device sends a handover request message to the first access network device, where the handover request message includes indication information used to indicate a delay in performing ROHC processing on at least one packet forwarded by the second access network device, or indicate not to perform ROHC processing before a first packet, in at least one packet, that needs to be discarded is determined, where the first packet is a packet successfully received by the terminal device.

S204: The first access network device performs admission control.

S205: The first access network device sends a handover request acknowledgment to the second access network device.

S206: The second access network device sends RRC reconfiguration information to the terminal device, where the reconfiguration information includes a handover command.

S207: The second access network device sends the at least one packet to the first access network device, where the at least one packet is a packet of the terminal device obtained by the second access network device from a core network. The second access network device allocates a sequence number to the at least one packet, and then duplicates the packet to obtain two duplicate packets, where one duplicate packet is sent by the second access network device to the terminal device after ROHC processing, and the other duplicate packet is sent to the first access network device. The first access network device performs ROHC processing on the packet and sends the packet to the terminal device.

S208: The first access network device determines to delay performing ROHC processing (or PDCP processing) on the at least one packet sent by the second access network device, or the first access network device determines not to perform ROHC processing before determining the first packet that needs to be discarded in the at least one packet.

S209: The terminal device randomly accesses the first access network device.

S210: After accessing the first access network device, the terminal device sends RRC reconfiguration complete information to the first access network device.

S211: The terminal device sends a PDCP status report to the first access network device, where the PDCP status report is used to indicate that the terminal device determines a successfully received packet or determines an unsuccessfully received packet.

S212: The first access network device discards, based on the PDCP status report, the packet that the terminal device has determined as being received.

S213: The first access network device indicates to perform ROHC processing or PDCP processing on a remaining packet.

Figure 8:
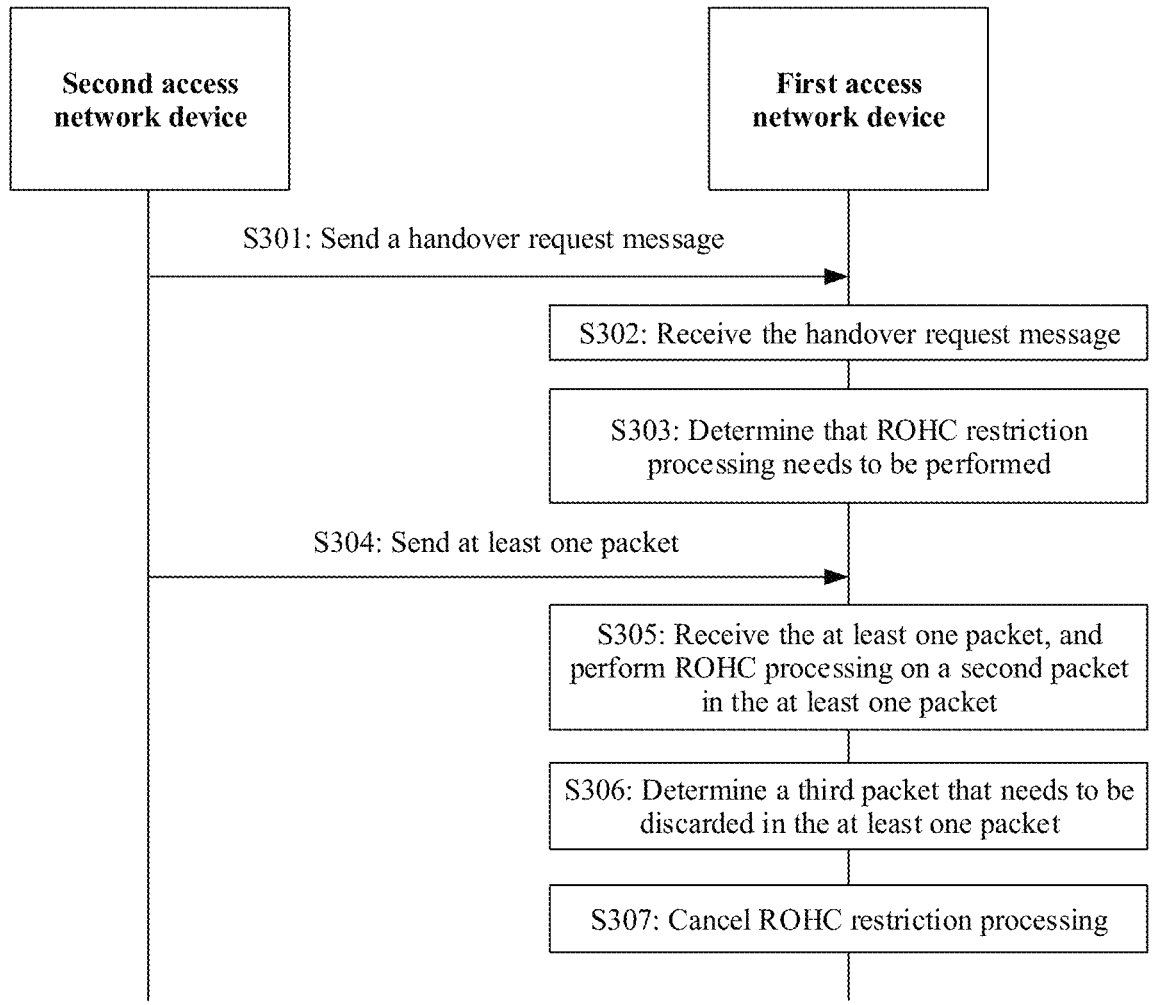
FIG. 8 is a flowchart of another data processing method according to an embodiment of this application.

Based on the devices in the wireless communication system 100, an embodiment of this application provides another packet processing method. As shown in FIG. 8, the method includes but is not limited to the following operations.

S301: A second access network device sends a handover request message to a first access network device, where the handover request message is used to request a terminal device to hand over from a cell of the second access network device to a cell of the first access network device.

S302: The first access network device receives the handover request message.

S303: The first access network device determines that ROHC restriction processing needs to be performed, where the ROHC restriction processing includes: performing no ROHC header compression, generating only initial and refresh (IR) packets, or performing ROHC processing in an R mode.

S304: The second access network device sends at least one packet to the first access network device.

S305: The first access network device receives the at least one packet from the second access network device, and performs the ROHC restriction processing on a second packet in the at least one packet.

To avoid interruption during the handover, after receiving the handover request message, the first access network device determines that ROHC restriction processing needs to be performed. For example, a PDCP layer of the first access network device indicates an ROHC layer to perform ROHC restriction processing. When the ROHC layer is indicated that ROHC restriction processing needs to be performed, the ROHC layer performs ROHC restriction processing on a subsequent packet. The ROHC restriction processing includes: performing no ROHC header compression, generating only initial and refresh (IR) packets, or performing ROHC processing in an R mode.

The performing no ROHC header compression may be generating an uncompressed packet. The uncompressed packet includes an IR packet and an uncompressed packet that is in a specific format. For example, the first access network device may first generate an IR packet, and a profile ID in the IR packet may be a specific value 0x0000. The specific value is used to indicate that header compression is not performed on the packet. A context ID is also carried. The IR packet is used by the terminal device to establish a correspondence between a context ID and an uncompressed type. After sending a preset quantity of IR packets, the first access network device sends an uncompressed packet in a specific format. The uncompressed packet in the specific format includes a context ID, but no header compression is performed on the packet. After receiving the uncompressed packet in the specific format, the terminal device learns, based on the pre-established correspondence between a context ID and an uncompressed type, that the uncompressed packet in the special format is an uncompressed packet.

The generating only IR packets means that the first access network device cannot send a packet in an original U mode, but needs to keep sending the IR packets before canceling the ROHC restriction processing. In the original U mode, a compressed packet is sent after a preset quantity of IR packets are sent.

The ROHC processing is performed in the R mode. In a conventional technology, a mode used by the ROHC layer for processing is not fixed, and is independently selected by the ROHC layer. However, in this embodiment of this application, the PDCP layer indicates that the ROHC layer needs to use the R mode for processing. To be specific, the ROHC layer sends a compressed packet only after receiving feedback information that is sent by the terminal device and that is used to indicate that the terminal device successfully establishes the correspondence between context IDs and compressed content. Even if the first access network device discards the IR packets based on a PDCP status report, because the first access network device does not receive the feedback information from the terminal device, the first access network device continues to send IR packets, so that the terminal device establishes the correspondence between context IDs and compressed content. Therefore, discarding of the packets does not cause a decompression failure of a subsequent packet.

After the second access network device determines that the terminal device needs to perform cell handover, the second access network device sends the at least one packet of the terminal device to the first access network device. Optionally, the at least one packet may be obtained after the second access network device duplicates the packet that is of the terminal device and that is obtained from a core network. For example, before the handover, the second access network device obtains packets of the terminal device from the core network and then performs sequence numbering, for example, by using Arabic numerals, for example, 100 to 130, and finally, duplicates the numbered packets to obtain two duplicate packets in total, where each duplicate packet includes at least one packet, and quantities of packets in the two duplicate packets are the same. For example, each duplicate packet includes 31 packets. One duplicate packet is delivered to the terminal device by the second access network device, and the other duplicate packet is sent to the terminal device by the first access network device.

The first access network device receives the at least one packet from the second access network device, and performs ROHC restriction processing on a second packet in the at least one packet, where the second packet may be a part of the at least one packet, and the second packet may include one or more packets. For example, if the at least one packet is packets numbered 100 to 130, the second packet may be packets numbered 100 to 106. A quantity of packets included in the second packet may depend on a processing speed of the first access network device and time for canceling the ROHC restriction processing by the first access network device. For example, if the time for canceling the ROHC restriction processing is relatively late, the second packet includes a relatively large quantity of packets; if the time for canceling the ROHC restriction processing is relatively early, the second packet includes a relatively small quantity of packets. Alternatively, the second packet may include zero packets. For example, when the terminal device feeds back a PDCP status report, the first access network device does not perform ROHC restriction processing on any one of the packets.

S306: The first access network device determines a third packet that needs to be discarded in the at least one packet, where the third packet is a packet successfully received by the terminal device.

In an embodiment, when the terminal device is handed over from the cell of the second access network device to the cell of the first access network device, before the terminal device disconnects a network connection to the second access network device, the terminal device may receive a packet sent by the second access network device. After the terminal device establishes a network connection to the first access network device, the terminal device may receive a packet sent by the first access network device. To avoid repeated reception, after establishing the network connection to the first access network device, the terminal device sends the PDCP status report to the first access network device, where the PDCP status report is used to indicate that the terminal device determines a successfully received packet or determines an unsuccessfully received packet. In this way, after receiving the PDCP status report, the first access network device determines the third packet that needs to be discarded in the at least one packet received from the second access network device. It should be noted that the packet that the terminal device has determined as being successfully received may be a packet sent by the second access network device to the terminal device before the second access network device disconnects the network connection to the terminal device. Alternatively, the packet that the terminal device has determined as being successfully received may include a packet sent by the second access network device to the terminal device before the second access network device disconnects the network connection to the terminal device, and a packet sent by the first access network device to the terminal device after the first access network device establishes the network connection to the terminal device. This is not limited in this embodiment of this application.

The third packet may include one packet, a plurality of packets, or zero packets. It should be noted that the third packet and the second packet may include a same packet. For example, if the terminal device sends the PDCP status report relatively early, the second packet on which the first access network device performs ROHC restriction processing does not include a relatively large quantity of packets, included packets may be numbered 100 and 101, and the third packet that needs to be discarded and that is determined based on the PDCP status report may include packets numbered 100 to 106, the third packet includes the second packet. Alternatively, if the terminal device sends the PDCP status report relatively late, the second packet on which the first access network device performs ROHC restriction processing includes a relatively large quantity of packets, included packets may be numbered 100 to 110, and the third packet that needs to be discarded and that is determined based on the PDCP status report may include packets numbered 100 to 105, the second packet includes the third packet. Alternatively, a quantity of packets included in the second packet is the same as the quantity of packets included in the third packet. This is not limited in this embodiment of this application.

S307: The first access network device cancels the ROHC restriction processing after determining the third packet that needs to be discarded.

In an embodiment, after determining the third packet that needs to be discarded, the first access network device may cancel the ROHC restriction processing, to improve transmission efficiency, where canceling the ROHC restriction processing may be performing no ROHC restriction processing.

Optionally, if the ROHC restriction processing includes performing no header compression or generating only IR packets, canceling the ROHC restriction processing may be indicating the ROHC layer to reset to an initial state. Resetting to the initial state means that the ROHC layer cannot rely on the previously established correspondence between context IDs and compressed content, a context ID needs to be re-allocated to compressed content, and an IR packet used by the terminal device to establish the correspondence between context IDs and compressed content is regenerated.

Optionally, if the ROHC restriction processing includes performing processing in an R mode, canceling the ROHC restriction processing may be performing processing in any other mode, where the any other mode may include any one of an R mode, a U mode, and an O mode.

Further, in an embodiment, after the first access network device cancels the ROHC restriction processing, the first access network device performs ROHC processing on a packet other than the second packet and the third packet in the at least one packet forwarded by the second access network device. That is, the first access network device performs ROHC processing only on a packet on which no ROHC restriction processing is performed and that the terminal device has determined as being successfully received.

Optionally, the second access network device may indicate, to the first access network device, that ROHC restriction processing needs to be performed before the third packet that needs to be discarded is determined. For example, the handover request message sent by the second access network device to the first access network device comprises second indication information, and the second indication information is used to instruct the first access network device to perform ROHC restriction processing before determining the third packet that needs to be discarded; or the second indication information is used to indicate that the handover performed by the terminal device is handover with 0 ms interruption. In other words, the second indication information may directly indicate or indirectly indicate that the first access network device needs to perform the ROHC restriction processing. The first access network device may learn, by using the second indication information, that ROHC restriction processing needs to be performed, and perform ROHC restriction processing on a subsequent packet until the ROHC restriction processing is canceled.

According to this embodiment of this application, before determining the third packet that needs to be discarded, the first access network device performs ROHC restriction processing, including performing no header compression, generating only IR packets, or performing processing in the R mode. Discarding of the third packet does not cause a decompression failure of a subsequent packet. Therefore, a decompression failure of the terminal device is avoided.

Figure 9:
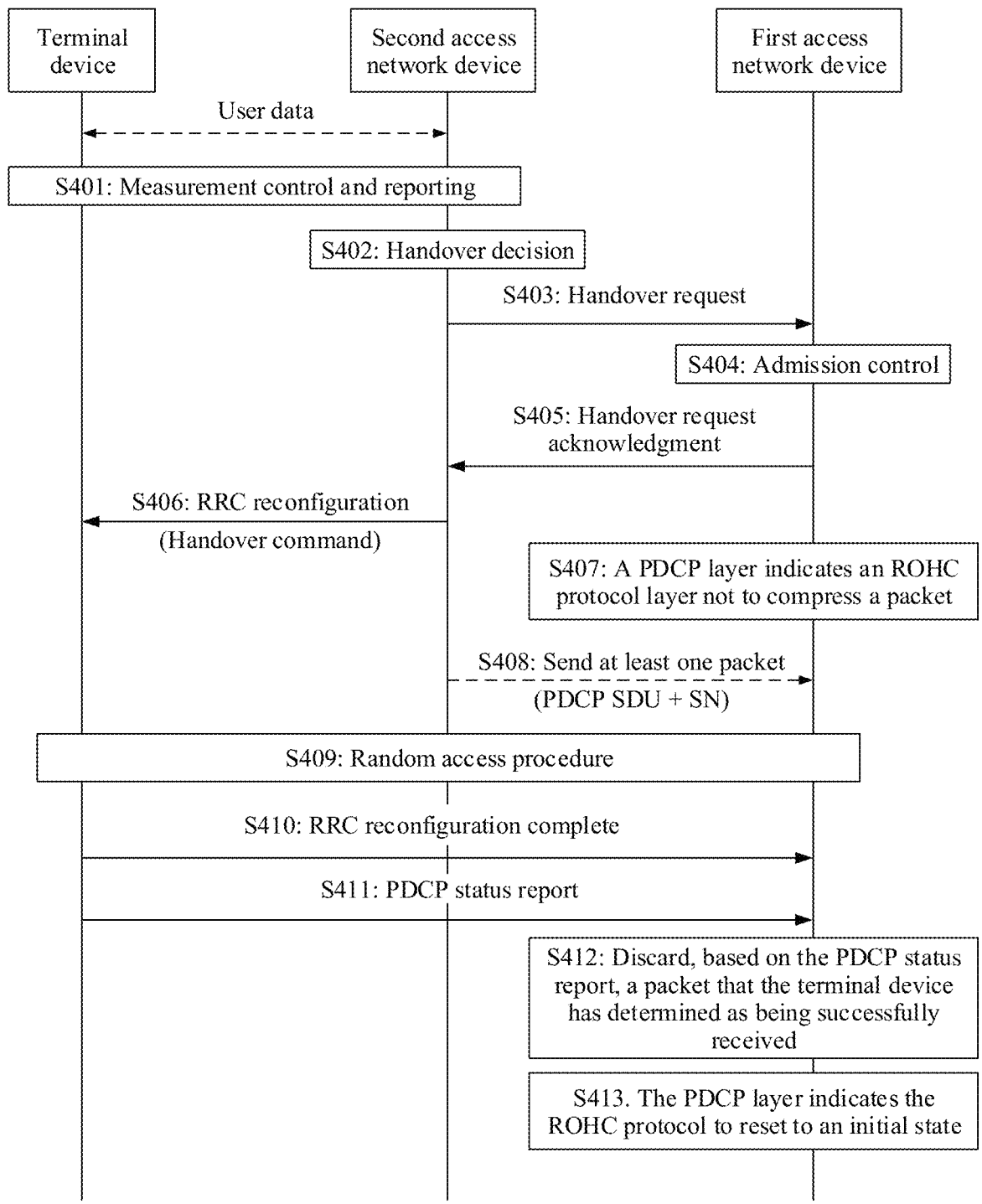
FIG. 9 is an interaction diagram of a data processing method in an application scenario according to an embodiment of this application.

Based on the descriptions in the embodiment in FIG. 8, FIG. 9 is a technical implementation in a specific application scenario according to an embodiment of this application. The technical implementation includes the following operations.

S401: A second access network device and a terminal device perform measurement control and reporting.

Before operation S401, the second access network device and the terminal device establish a network connection, and transmit user data.

S402: The second access network device makes a handover decision.

S403: The second access network device sends a handover request message to the first access network device, where the handover request message includes indication information used to indicate that ROHC header compression is not to be performed on a packet forwarded by the second access network device, or to generate only IR packets.

S404: The first access network device performs admission control.

S405: The first access network device sends a handover request acknowledgment to the second access network device.

S406: The second access network device sends RRC reconfiguration information to the terminal device, where the reconfiguration information includes a handover command.

S407: A PDCP layer of the first access network device indicates an ROHC layer not to perform ROHC header compression on the packet or to generate only the IR packets.

S408: The first access network device receives at least one packet sent by the second access network device, where the packet is a packet of the terminal device obtained by the second access network device from a core network. The second access network device first allocates a sequence number to the packet, and then duplicates the packet to obtain two duplicate packets. One duplicate packet is sent by the second access network device to the terminal device after ROHC protocol processing. The other duplicate packet is sent to the first access network device, and the first access network device performs ROHC protocol processing on the packet and sends the packet to the terminal device.

S409: The terminal device randomly accesses the first access network device.

S410: After accessing the first access network device, the terminal device sends RRC reconfiguration complete information to the first access network device.

S411: The terminal device sends a PDCP status report to the first access network device, where the PDCP status report is used to indicate that the terminal device determines a successfully received packet or determines an unsuccessfully received packet.

S412: The first access network device discards, based on the PDCP status report, the packet that the terminal device has determined as being received.

S413: The PDCP layer of the first access network device indicates the ROHC layer to reset to an initial state.

Figure 10:
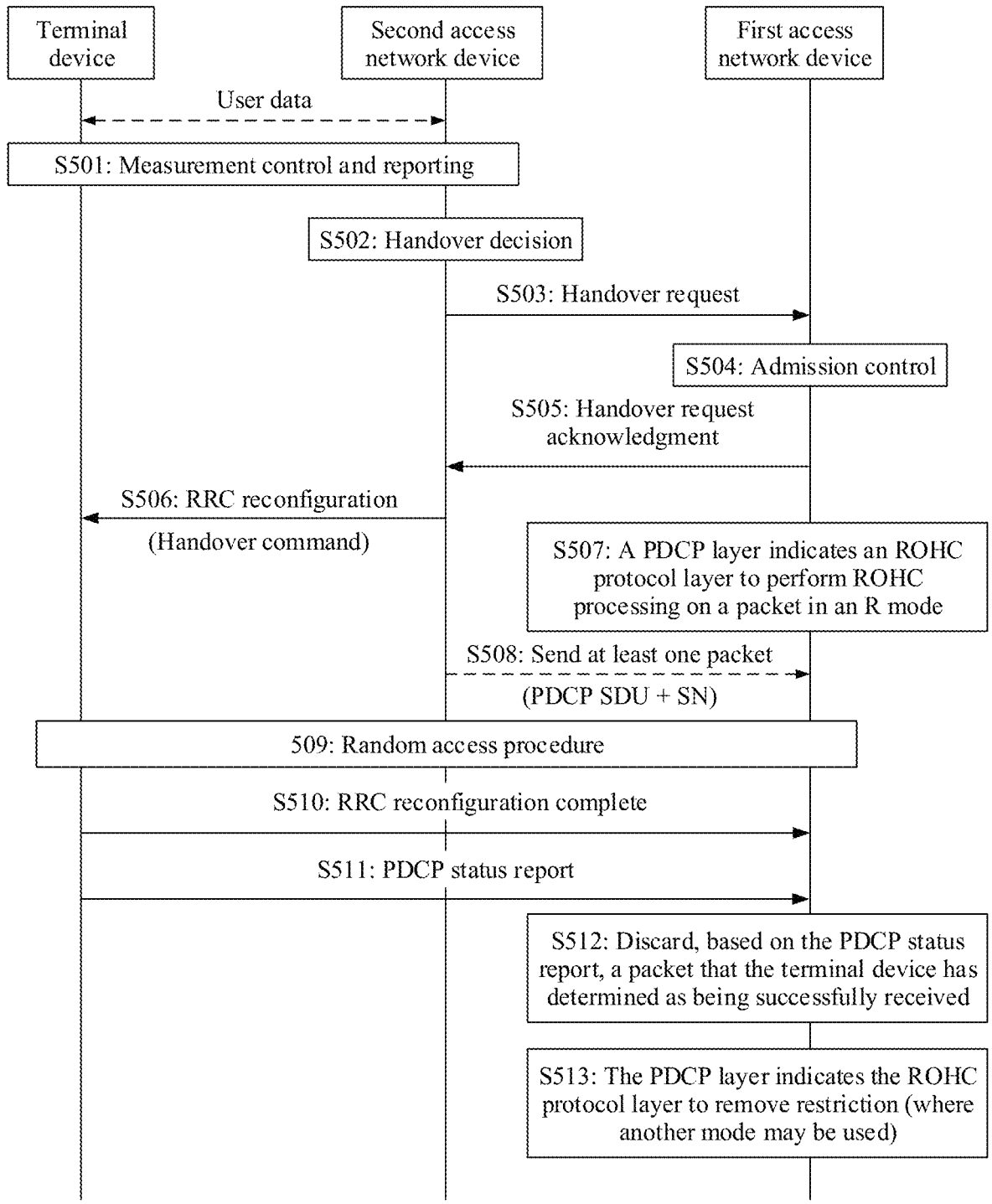
FIG. 10 is an interaction diagram of a data processing method in another application scenario according to an embodiment of this application.

Based on the descriptions in the embodiment in FIG. 8, FIG. 10 is a technical implementation in another specific application scenario according to an embodiment of this application. The technical implementation includes the following operations.

S501: A second access network device and a terminal device perform measurement control and reporting.

Before operation S501, the second access network device and the terminal device establish a network connection, and transmit user data.

S502: The second access network device makes a handover decision.

S503: The second access network device sends a handover request to a first access network device, where the handover request includes indication information used to indicate that an ROHC layer of the first access network device uses an R mode.

S504: The first access network device performs admission control.

S505: The first access network device sends a handover request acknowledgment to the second access network device.

S506: The second access network device sends RRC reconfiguration information to the terminal device, where the reconfiguration information includes a handover command.

S507: A PDCP layer of the first access network device indicates the ROHC layer to use the R mode for processing.

S508: The first access network device receives at least one packet sent by the second access network device, where the packet is a packet of the terminal device obtained by the second access network device from a core network. The second access network device first allocates a sequence number to the packet, and then duplicates the packet to obtain two duplicate packets. One duplicate packet is sent by the second access network device to the terminal device after ROHC protocol processing. The other duplicate packet is sent to the first access network device, and the first access network device performs ROHC protocol processing on the packet and sends the packet to the terminal device.

S509: The terminal device randomly accesses the first access network device.

S510: The terminal device sends RRC reconfiguration complete information to the first access network device.

S511: The terminal device sends a PDCP status report to the first access network device, where the PDCP status report is used to indicate that the terminal device determines a received packet or determines an unsuccessfully received packet.

S512: The first access network device discards, based on the PDCP status report, the packet that the terminal device has determined as being received.

S513: The PDCP layer of the first access network device indicates the ROHC layer to release the restriction, and processing may be performed in another mode, where the another mode may be a U mode, an O mode, or an R mode.

Figure 11:
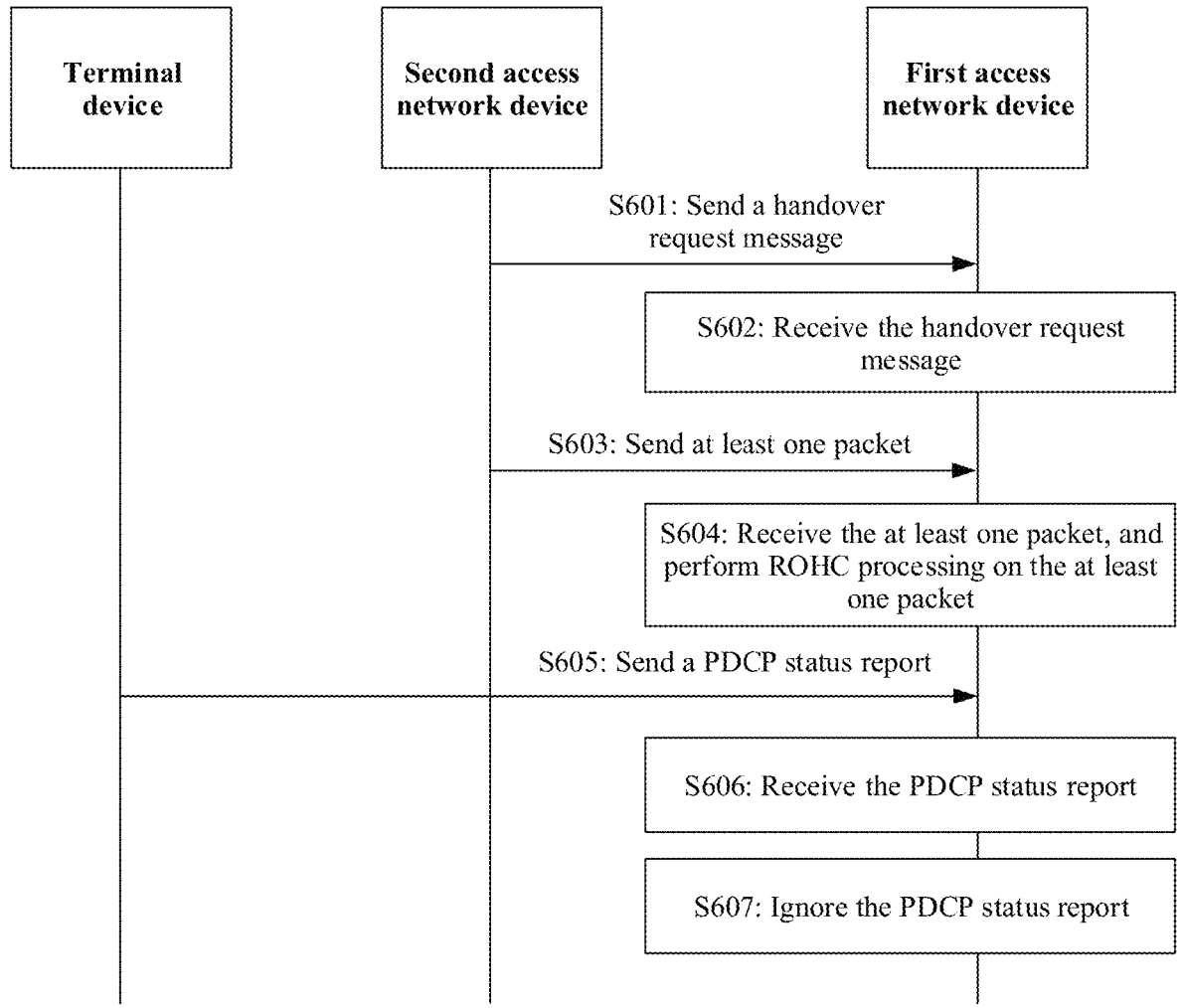
FIG. 11 is a flowchart of still another data processing method according to an embodiment of this application.

Based on the devices in the wireless communication system 100, an embodiment of this application provides another packet processing method. As shown in FIG. 11, the method includes but is not limited to the following operations.

S601: A second access network device sends a handover request message to a first access network device, where the handover request message is used to request a terminal device to hand over from a cell of the second access network device to a cell of the first access network device.

S602: The first access network device receives the handover request message from the second access network device.

S603: The second access network device sends at least one packet to the first access network device.

S604: The first access network device receives the at least one packet from the second access network device, and performs ROHC processing on the at least one packet.

In an embodiment, the terminal device may perform cell handover. For example, the terminal device may be handed over from the cell of the second access network device to the cell of the first access network device. The second access network device sends the handover request message to the first access network device, where the handover request message is used to request the terminal device to hand over from the cell of the second access network device to the cell of the first access network device. The first access network device receives the handover request message sent by the second access network device, and parses the handover request message, to learn that the terminal device needs to hand over from the cell of the second access network device to the cell of the first access network device. It should be noted that the handover request message may have another message name. For example, the handover request message may be a handover command, a handover request, or the like. This is not limited in this embodiment of this application.

To avoid interruption during the handover, after determining that the terminal device needs to perform cell handover, the second access network device sends the at least one packet of the terminal device to the first access network device. Optionally, the at least one packet may be obtained after the second access network device duplicates a packet that is of the terminal device and that is obtained from a core network. For example, before the handover, the second access network device obtains the packet of the terminal device from the core network. When determining that the terminal device needs to hand over from the cell of the second access network device to the cell of the first access network device, the second access network device duplicates the packet of the terminal device. Then sequence numbering is performed, for example, numbering is performed by using Arabic numeral, for example, 100 to 130. Finally, packets numbered are duplicated to obtain two sets of packets in total, where each packet includes at least one packet, and quantities of the two sets of the packets are the same. For example, each packet includes 31 packets. One set of the packets are delivered to the terminal device by the second access network device, and the other set of the packets are sent to the terminal device by the first access network device.

After receiving the at least one packet sent by the second access network device, the first access network device performs ROHC processing on each of the at least one packet.

S605: The terminal device sends a PDCP status report to the first access network device.

S606: The first access network device receives the packet data convergence protocol (PDCP) status report from the terminal device, where the PDCP status report is used to indicate that the terminal device determines a successfully received packet or determines an unsuccessfully received packet.

S607: The first access network device ignores the PDCP status report.

In an embodiment, after establishing a network connection to the first access network device, the terminal device sends the PDCP status report to the first access network device. To prevent the first access network device from discarding IR packets obtained after ROHC processing, the first access network device ignores the PDCP status report.

Optionally, that the first access network device ignores the PDCP status report may be that the first access network device skips discarding, in the at least one packet, a packet that the terminal device has determined as being successfully received. In other words, the first access network device does not process the PDCP status report, and therefore continues to perform ROHC processing and sends each packet obtained after the ROHC processing to the terminal device, or the first access network device discards the PDCP status report.

Optionally, the second access network device may indicate the first access network device to ignore the PDCP status report. For example, the handover request message sent by the second access network device to the first access network device carries third indication information, where the third indication information is used to instruct the first access network device to ignore the received PDCP status report, or the third indication information is used to instruct the terminal device to perform handover with 0 ms interruption. When receiving the handover request message, the terminal device may learn that the PDCP status report sent by the terminal device needs to be ignored.

Further, the terminal device receives the packet that is obtained after ROHC processing and that is sent by the first access network device. Because the first access network device does not discard the packet, the terminal device receives some duplicate packets, but the duplicate packets may be IR packets. Therefore, after detecting the duplicate packets, the terminal device cannot immediately discard the packets. Instead, the terminal device needs to decompress the ROHC header before discarding the packets.

According to this embodiment of this application, after receiving the PDCP status report, the first access network device directly ignores the PDCP status report, and does not discard the packet, and an IR packet is not lost. Therefore, a decompression failure of the terminal device can also be avoided.

Figure 12:
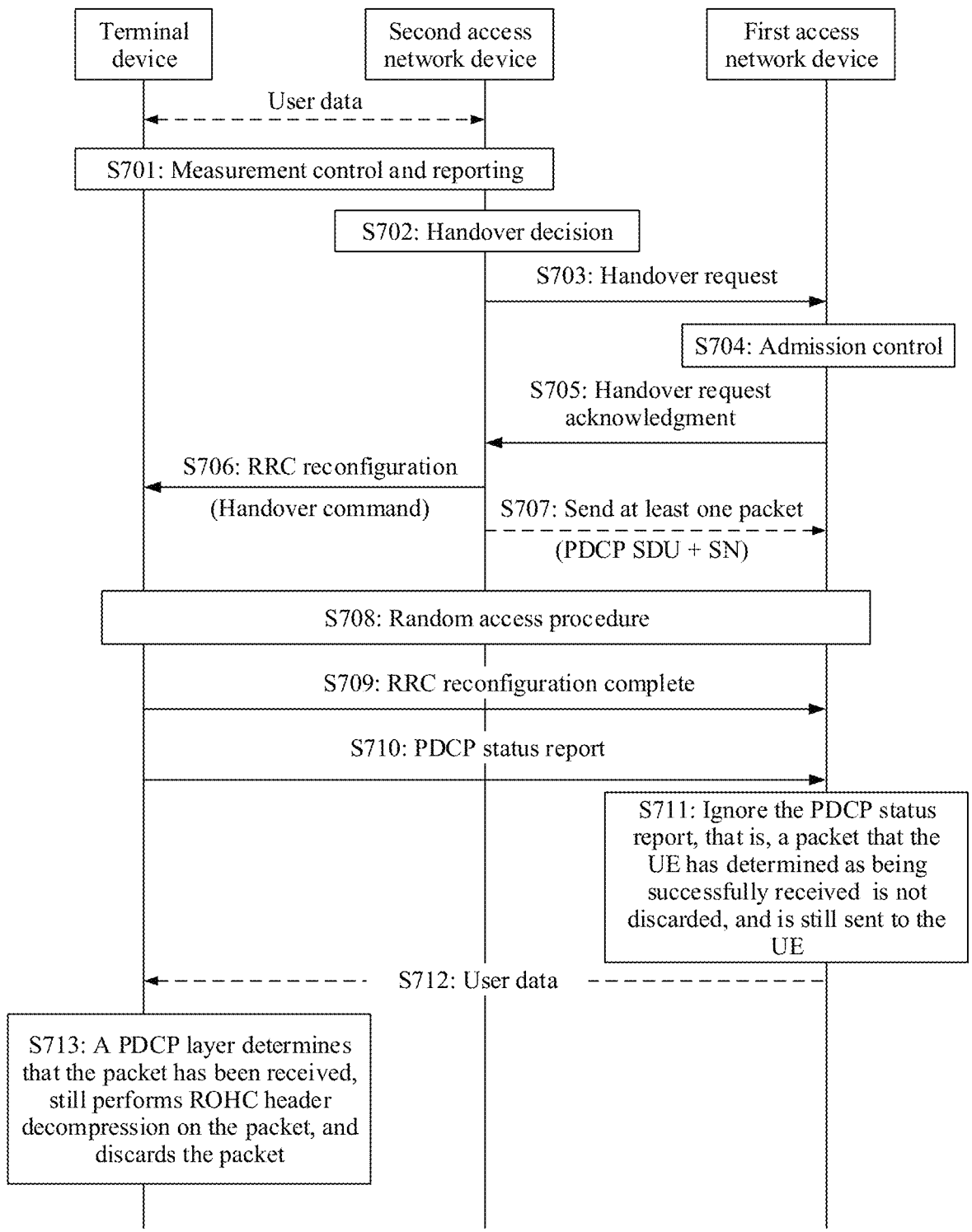
FIG. 12 is an interaction diagram of a data processing method in an application scenario according to an embodiment of this application.

Based on the descriptions in the embodiment in FIG. 11, FIG. 12 is a technical implementation in a specific application scenario according to an embodiment of this application. The technical implementation includes the following operations.

S701: A second access network device and a terminal device perform measurement control and reporting.

Before operation S701, the second access network device and the terminal device establish a network connection, and transmit user data.

S702: The second access network device makes a handover decision.

S703: The second access network device sends a handover request message to the first access network device, where the handover request message includes indication information used to instruct the first access network device to ignore a PDCP status report sent by the terminal device.

S704: The first access network device performs admission control.

S705: The first access network device sends a handover request acknowledgment to the second access network device.

S706: The second access network device sends RRC reconfiguration information to the terminal device, where the reconfiguration information includes a handover command.

S707: The second access network device sends at least one packet to the first access network device, where the packet is a packet of the terminal device obtained by the second access network device from a core network. The second access network device first allocates a sequence number to the packet, and then duplicates the packet to obtain two duplicate packets. One duplicate packet is sent by the second access network device to the terminal device after ROHC protocol processing. The other duplicate packet is sent to the first access network device, and the first access network device performs ROHC protocol processing on the packet and sends the packet to the terminal device.

S708: The terminal device randomly accesses the first access network device.

S709: The terminal device sends RRC reconfiguration complete information to the first access network device.

S710: The terminal device sends the PDCP status report to the first access network device, where the PDCP status report is used to indicate that the terminal device determines a received packet or determines an unsuccessfully received packet.

S711: The first access network device ignores the PDCP status report, that is, the first access network device does not discard the packet determined by the terminal device, and still sends the packet to the terminal device.

S712: The first access network device sends all packets to the terminal device.

S713: A PDCP layer of the terminal device determines that the packet has been received, and still performs ROHC header decompression and discards the packet.

Figure 13:
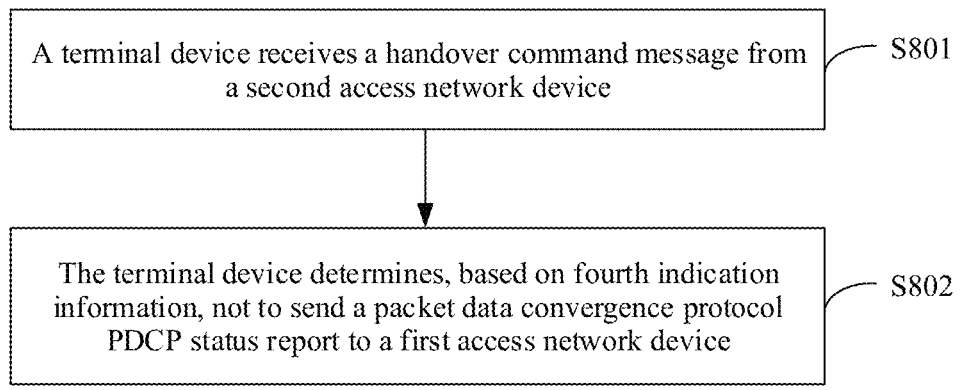
FIG. 13 is a flowchart of still another data processing method according to an embodiment of this application.

Based on the devices in the wireless communication system 100, an embodiment of this application provides another packet processing method. As shown in FIG. 13, the method includes but is not limited to the following operations.

S801: A terminal device receives a handover command message from a second access network device, where the handover command message is used to instruct the terminal device to hand over from a cell of the second access network device to a cell of a first access network device, the handover command message carries fourth indication information, and the fourth indication information is used to indicate that the handover performed by the terminal device is handover with 0 ms interruption, or indicate that the second access network device duplicates, during the handover, user data to the first access network device for sending.

S802: The terminal device determines, based on the fourth indication information, not to send a packet data convergence protocol (PDCP) status report to the first access network device, where the PDCP status report is used to indicate that the terminal device determines a successfully received packet or determines an unsuccessfully received packet.

In an embodiment, a message name of the handover command message may be a handover command, handover indication information, handover information, or the like. This is not limited in this embodiment of this application.

Optionally, the fourth indication information may directly indicate the terminal device not to send the PDCP status report to the first access network device, or the fourth indication information may indirectly indicate the terminal device not to send the PDCP status report to the first access network device. For example, the fourth indication information is used to indicate that the handover performed by the terminal device is handover with 0 ms interruption, or the fourth indication information indicates that the second access network device duplicates, during the handover, the user data to the first access network device for sending. The terminal device learns, by using the fourth indication information, that the PDCP status report does not need to be sent to the first access network device. It may be understood that, that the terminal device does not send the PDCP status report to the first access network device may also be referred to as a operation in which the terminal device skips sending the PDCP status report to the first access network device.

The first access network device obtains at least one packet sent by the second access network device. Optionally, the at least one packet may be obtained after the second access network device duplicates the packet that is of the terminal device and that is obtained from a core network. Because the terminal device does not send the PDCP status report to the first access network device, the first access network device performs ROHC processing on each of the received at least one packet, and sends the packet to the terminal device. The terminal device receives, from the first access network device, the at least one packet on which ROHC processing is performed. Because the first access network device does not discard the packet, a duplicate packet may exist in the at least one packet on which ROHC processing is performed and received by the terminal device. The packet already received by the terminal device may be a duplicate packet received by the second access network device. To prevent IR packets from being discarded, the terminal device does not discard the IR packets even if the terminal device detects the duplicate packet. Instead, the terminal device performs ROHC header decompression and discards the IR packets.

According to this embodiment of this application, the terminal device does not send the PDCP status report to the first access network device. Therefore, the first access network device does not discard, based on the PDCP status report, the packet obtained after ROHC processing, and there is no risk of discarding the IR packets. Therefore, a decompression failure of the terminal device is avoided.

Figure 14:
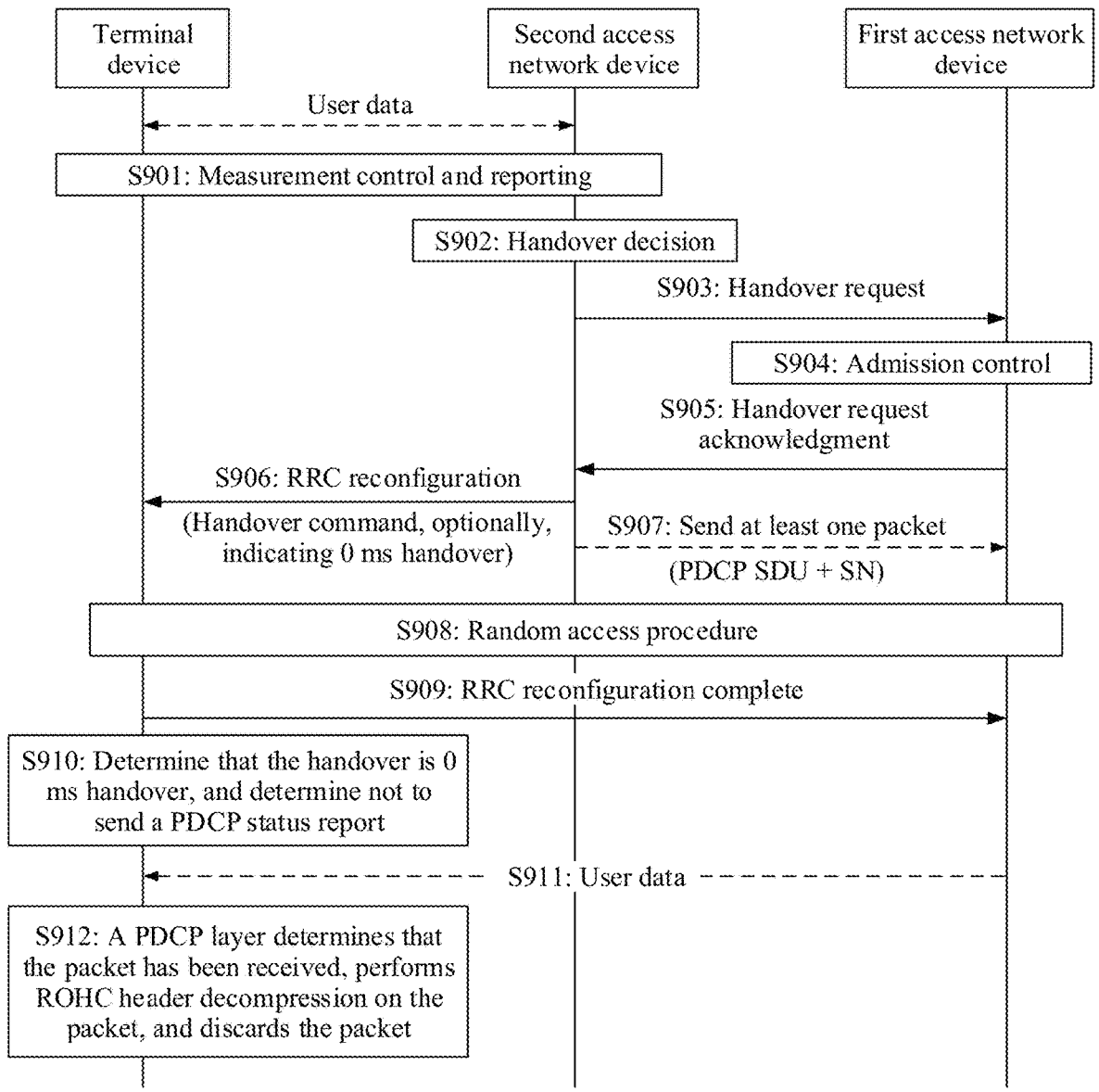
FIG. 14 is an interaction diagram of a data processing method in an application scenario according to an embodiment of this application.

Based on the descriptions in the embodiment in FIG. 13, FIG. 14 is a technical implementation in a specific application scenario according to an embodiment of this application. The technical implementation includes the following operations.

S901: A second access network device and a terminal device perform measurement control and reporting.

Before operation S901, the second access network device and the terminal device establish a network connection, and transmit user data.

S902: The second access network device makes a handover decision.

S903: The second access network device sends a handover request to the first access network device.

S904: The first access network device performs admission control.

S905: The first access network device sends a handover request acknowledgment to the second access network device.

S906: The second access network device sends RRC reconfiguration information to the terminal device, where the reconfiguration information includes a handover command, the handover command includes indication information, and the indication information is used to indicate handover with 0 ms interruption.

S907: The second access network device sends at least one packet to the first access network device, where the packet is a packet of the terminal device obtained by the second access network device from a core network. The second access network device first allocates a sequence number to the packet, and then duplicates the packet to obtain two duplicate packets. One duplicate packet is sent by the second access network device to the terminal device after ROHC protocol processing. The other duplicate packet is sent to the first access network device, and the first access network device performs ROHC protocol processing on the packet and sends the packet to the terminal device.

S908: The terminal device randomly accesses the first access network device.

S909: After accessing the first access network device, the terminal device sends RRC reconfiguration complete information to the first access network device.

S910: The terminal device determines that the handover is handover with 0 ms interruption, and determines not to send a PDCP status report to the first access network device.

S911: The terminal device transmits user data with the first access network device.

S912: A PDCP layer of the terminal device determines that the packet has been received, and still performs ROHC header decompression and discards the packet.

It should be noted that, in the foregoing embodiments of this application, operations implemented by the terminal device may alternatively be implemented by a component (for example, a circuit or a chip) that can be used in the terminal device, and operations implemented by the first access network device may alternatively be implemented by a component (for example, a circuit or a chip) that can be used in the first access network device, and the operations implemented by the second access network device may alternatively be implemented by a component (for example, a circuit or a chip) that can be used in the second access network device.

Figure 15:
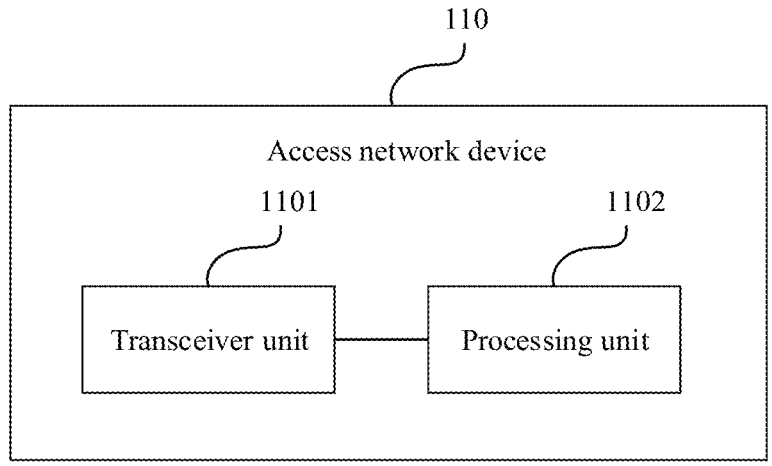
FIG. 15 is a functional block diagram of an access network device according to an embodiment of this application.

An embodiment of this application provides a communication apparatus. The communication apparatus may be a first access network device or a component that may be used in the first access network device. The communication apparatus may include a module or a unit, to implement the data processing method in FIG. 5, FIG. 8, or FIG. 11. In an embodiment, the foregoing data processing method may be implemented by a processing unit and a transceiver unit. The transceiver unit is configured to perform an operation of receiving or sending information or a message in the process, and the processing unit is configured to perform a corresponding processing operation, for example, determine to delay performing ROHC processing on at least one received packet. That is, ROHC processing is not performed before a first packet to be discarded is determined, to avoid a decompression failure of a terminal device due to discarding of an IR packet. Optionally, the transceiver unit may be controlled by the processing unit, that is, the processing unit may control the transceiver unit to perform a transceiver operation. In addition, the processing unit and the transceiver unit in the access network device may be logical modules divided according to functions, or may be corresponding hardware modules. When both the processing unit and the transceiver unit are logical modules, a structure of the access network device may be shown in FIG. 15.

In an embodiment, a transceiver unit 1101 is configured to receive a handover request message from a second access network device, where the handover request message is used to request a terminal device to hand over from a cell of the second access network device to a cell of the first access network device.

The transceiver unit 1101 is further configured to receive at least one packet from the second access network device.

A processing unit 1102 is configured to determine a first packet that needs to be discarded in the at least one packet, where the first packet is a packet successfully received by the terminal device, and a packet in the at least one packet other than the first packet is a remaining packet.

The processing unit 1102 is further configured to perform robust header compression (ROHC) processing on the remaining packet, where the first access network device does not perform ROHC processing before determining the first packet that needs to be discarded.

Specifically, the processing unit may be a processor, and the transceiver unit may be a transceiver, a transceiver circuit, or an interface circuit.

Optionally, the communication apparatus may further include a storage unit. The storage unit may include code (or a program) or data. The processing unit may be coupled to the storage unit, to, for example, invoke the code or the data in the storage unit, so that the communication apparatus implements the data processing method in the embodiment in FIG. 5, FIG. 8, or FIG. 11.

It may be understood that the processing unit, the transceiver unit, and the storage unit may be integrated or separated. This is not limited in this embodiment of this application.

Figure 16:
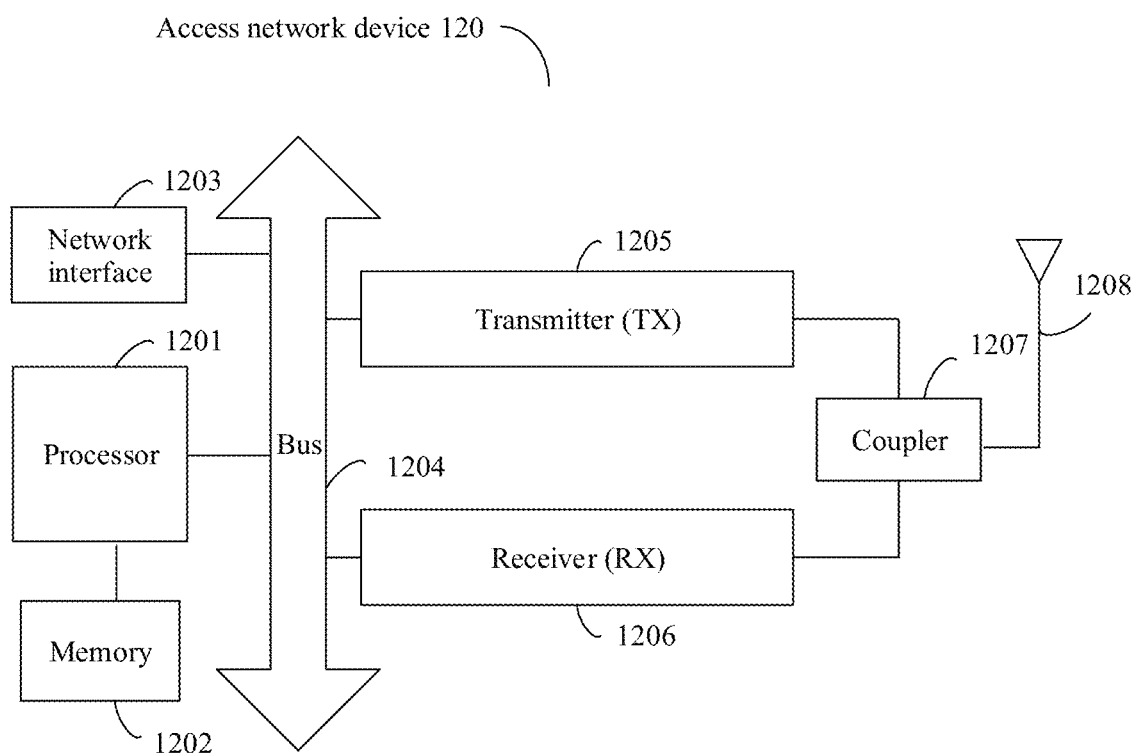
FIG. 16 is a schematic diagram of a hardware architecture of an access network device according to an embodiment of this application.

Optionally, FIG. 16 shows a structure of an access network device.

Refer to FIG. 16. FIG. 16 shows the access network device according to an embodiment of this application. The access network device may include one or more processors 1201, a memory 1202, a network interface 1203, a transmitter 1205, a receiver 1206, a coupler 1207, and an antenna 1208. These components may be connected through a bus 1204 or in another manner. In FIG. 16, an example in which the components are connected through the bus is used.

The network interface 1203 may be used by the access network device to communicate with another communication device, for example, another network device. Specifically, the network interface 1203 may be a wired interface.

The transmitter 1205 may be configured to perform transmission processing, for example, signal modulation, on a signal that is output by the processor 1201. The receiver 1206 may be configured to perform reception processing, for example, signal demodulation, on a mobile communication signal received by the antenna 1208. In some embodiments of this application, the transmitter 1205 and the receiver 1206 may be considered as a wireless modem. The access network device 120 may include one or more transmitters 1205 and one or more receivers 1206. The antenna 1208 may be configured to convert electromagnetic energy in a transmission line into an electromagnetic wave in free space, or convert an electromagnetic wave in free space into electromagnetic energy in a transmission line. The coupler 1207 may be configured to: divide a mobile communication signal into a plurality of signals, and allocate the signals to a plurality of receivers 1206.

The memory 1202 may be coupled to the processor 1201 through the bus 1204 or an input/output port, or the memory 1202 may be integrated with the processor 1201. The memory 1202 is configured to store various software programs and/or a plurality of groups of instructions and/or data. Specifically, the memory 1202 may include a high-speed random access memory, and may further include a nonvolatile memory, for example, one or more magnetic disk storage devices, a flash storage device, or another nonvolatile solid-state storage device. The memory 1202 may store an operating system (which is briefly referred to as a system below), for example, an embedded operating system such as uCOS, VxWorks, or RTLinux. The memory 1202 may further store a network communication program, and the network communication program may be configured to communicate with one or more additional devices, one or more terminals, and one or more network devices.

The processor 1201 may be configured to: manage a radio channel, establish and remove a call link and a communication link, provide cell handover control for a user in a local control area, and the like. Specifically, the processor 1201 may include: an administration/communication module (AM/CM) (which is used as a center of speech channel switching and information exchange), a basic module (BM) (configured to complete call processing, signaling processing, radio resource management, radio link management, and circuit maintenance functions), a transcoder and sub-multiplexer (TCSM) unit (configured to implement multiplexing/demultiplexing and transcoder functions), and the like.

In this embodiment of this application, the processor 1201 may be configured to: read and execute computer-readable instructions. Specifically, the processor 1201 may be configured to: invoke a program stored in the memory 1202, for example, the program for implementing, on the access network device 120 side, the data processing method provided in one or more embodiments of this application; and execute instructions included in the program.

In an embodiment, the receiver 1206 is configured to: receive a handover request message from a second access network device, where the handover request message is used to request a terminal device to hand over from a cell of the second access network device to a cell of the first access network device; and receive at least one packet from the second access network device.

The processor 1201 is configured to: determine a first packet that needs to be discarded in the at least one packet, where the first packet is a packet successfully received by the terminal device, and a packet in the at least one packet other than the first packet is a remaining packet; and perform robust header compression (ROHC) processing on the remaining packet, where the first access network device does not perform ROHC processing before determining the first packet that needs to be discarded.

It should be noted that the access network device 120 shown in FIG. 16 is merely an implementation of this embodiment of this application In an actual application, the access network device 120 may further include more or fewer components. This is not limited herein.

Figure 17:
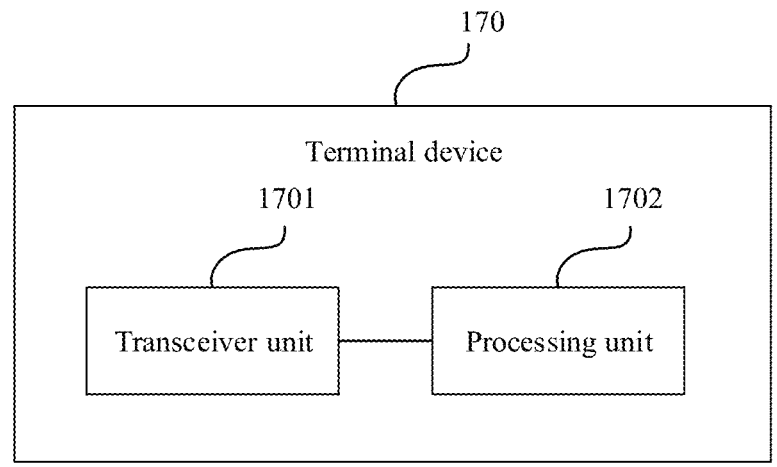
FIG. 17 is a functional block diagram of a terminal device according to an embodiment of this application.

An embodiment of this application provides a communication apparatus. The communication apparatus may be a terminal device or a component that may be used in the terminal device. The communication apparatus may include a module or a unit, to implement the data processing method in FIG. 13. In an embodiment, the foregoing data processing method may be implemented by a processing unit and a transceiver unit. The transceiver unit is configured to perform an operation of receiving or sending information or a message in the process, and the processing unit is configured to perform a corresponding processing operation. Optionally, the transceiver unit may be controlled by the processing unit, that is, the processing unit may control the transceiver unit to perform a transceiver operation. In addition, the processing unit and the transceiver unit in the access network device may be logical modules divided according to functions, or may be corresponding hardware modules. When both the processing unit and the transceiver unit are logical modules, a structure of the terminal device may be shown in FIG. 17.

A receiving unit 1701 is configured to receive a handover command message from a second access network device, where the handover command message is used to instruct the terminal device to hand over from a cell of the second access network device to a cell of a first access network device, the handover command message carries fourth indication information, and the fourth indication information is used to indicate that the handover performed by the terminal device is handover with 0 ms interruption, or indicate that the second access network device duplicates, during the handover, user data to the first access network device for sending.

A processing unit 1702 is configured to determine, based on the fourth indication information, not to send a packet data convergence protocol (PDCP) status report to the first access network device, where the PDCP status report is used to indicate that the terminal device determines a successfully received packet or determines an unsuccessfully received packet.

Specifically, the processing unit may be a processor, and the transceiver unit may be a transceiver, a transceiver circuit, or an interface circuit.

Optionally, the communication apparatus may further include a storage unit. The storage unit may include code (or a program) or data. The processing unit may be coupled to the storage unit, to, for example, invoke the code or the data in the storage unit, so that the communication apparatus implements the data processing method in the embodiment in FIG. 13.

It may be understood that the processing unit, the transceiver unit, and the storage unit may be integrated or separated. This is not limited in this embodiment of this application.

Figure 18:
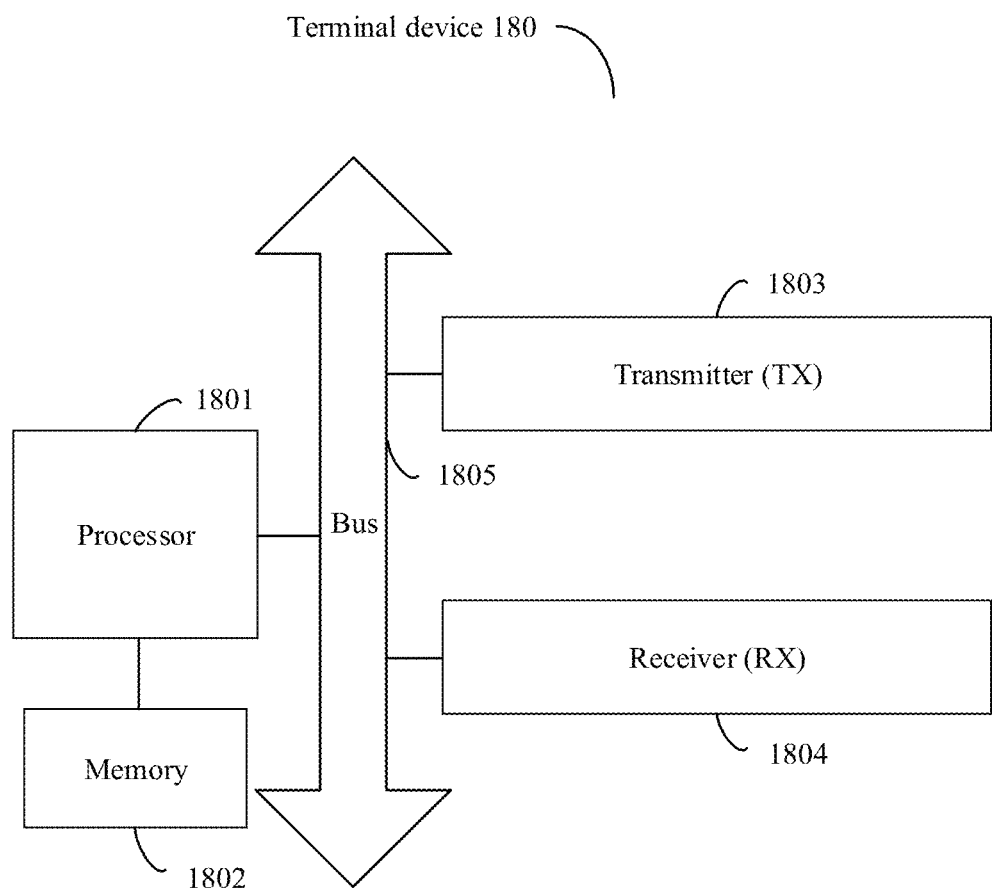
FIG. 18 is a schematic diagram of a hardware architecture of a terminal device according to an embodiment of this application.

Optionally, FIG. 18 shows a structure of a terminal device.

Refer to FIG. 18. FIG. 18 shows the terminal device according to an embodiment of this application. The terminal device 180 may include one or more processors 1801, a memory 1802, a transmitter 1803, and a receiver 1804. These components may be connected through a bus 1805 or in another manner. In FIG. 18, an example in which the components are connected through the bus is used.

The processor 1801 may be a general-purpose processor, for example, a central processing unit (CPU), a digital signal processor (DSP), an application-specific integrated circuit (ASIC), or one or more integrated circuits configured to implement the embodiments of this application. The processor 1801 may process data received by using the receiver 1804. The processor 1801 may further process data to be sent to the transmitter 1803.

The memory 1802 may be coupled to the processor 1801 through the bus 1805 or an input/output port, or the memory 1802 may be integrated with the processor 1801. The memory 1802 is configured to store various software programs and/or a plurality of groups of instructions. Specifically, the memory 1802 may include a high-speed random access memory, and may further include a nonvolatile memory, for example, one or more magnetic disk storage devices, a flash storage device, or another nonvolatile solid-state storage device. The memory 1802 may further store a network communication program, and the network communication program may be configured to communicate with one or more additional devices, one or more terminals, and one or more network devices.

The transmitter 1803 may be configured to perform transmission processing on a signal that is output by the processor 1801. The receiver 1804 may be configured to perform reception processing on a received communication signal. The terminal device 180 may include one or more transmitters 1803 and one or more receivers 1804.

The processor 1801 may be configured to read and execute computer-readable instructions. Specifically, the processor 1801 may be configured to: invoke a program stored in the memory 1802, for example, the program for implementing, on the terminal device 180 side, the data processing method provided in one or more embodiments of this application; and execute instructions included in the program to implement the method in the foregoing embodiment. Optionally, the processor 1801 drives or controls the transmitter 1803 to send any message or data. Optionally, the processor 1801 drives or controls the receiver 1804 to receive any message or data. Therefore, the processor 1801 may be considered as a control center for performing sending or reception, and the transmitter 1803 and the receiver 1804 are specific executors of sending and reception operations.

The receiver 1804 is configured to receive a handover command message from a second access network device, where the handover command message is used to instruct the terminal device to hand over from a cell of the second access network device to a cell of a first access network device, the handover command message carries fourth indication information, and the fourth indication information is used to indicate that the handover performed by the terminal device is handover with 0 ms interruption, or indicate that the second access network device duplicates, during the handover, user data to the first access network device for sending.

The processor 1801 is configured to determine, based on the fourth indication information, not to send a packet data convergence protocol (PDCP) status report to the first access network device, where the PDCP status report is used to indicate that the terminal device determines a successfully received packet or determines an unsuccessfully received packet.

It should be noted that the terminal device 180 shown in FIG. 18 is merely an implementation of this embodiment of this application. In an actual application, the terminal device 180 may further include more or fewer components. This is not limited herein.

Figure 19:
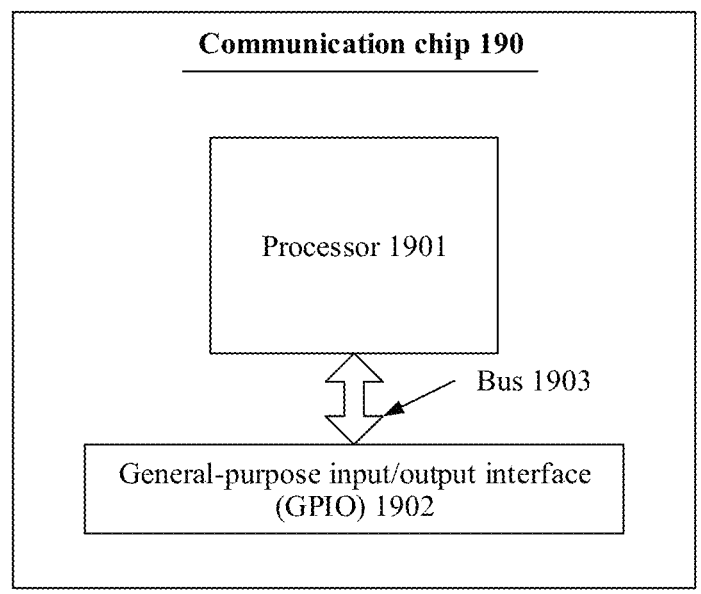
FIG. 19 is a schematic diagram of a structure of a communication chip according to an embodiment of this application.

FIG. 19 is a schematic structural diagram of a communication chip according to this application. As shown in FIG. 19, the communication chip 190 may include a processor 1901 and one or more interfaces 1902 coupled to the processor 1901.

The processor 1901 may be configured to read and execute computer-readable instructions. In a specific implementation, the processor 1901 may mainly include a controller, an arithmetic unit, and a register. The controller is mainly responsible for decoding instructions, and sends a control signal for an operation corresponding to the instructions. The arithmetic unit is mainly responsible for performing a fixed-point or floating-point arithmetic operation, a shift operation, a logic operation, and the like, or may perform an address operation and address conversion. The register is mainly responsible for storing a register operand, an intermediate operation result, and the like that are temporarily stored during instruction execution. In a specific implementation, a hardware architecture of the processor 1901 may be an application-specific integrated circuit (ASIC) architecture, an MIPS architecture, an ARM architecture, an NP architecture, or the like. The processor 1901 may be a single-core or multi-core processor.

The interface 1902 may be configured to input to-be-processed data to the processor 1901, and may output a processing result of the processor 1901. For example, the interface 1902 may be a general-purpose input/output (GPIO) interface, and may be connected to a plurality of peripheral devices (such as a display (LCD), a camera, and a radio frequency (RF) module). The interface 1902 is connected to the processor 1901 through a bus 1903.

In this application, the processor 1901 may be configured to: invoke, from a memory, a program for implementing, on a communication device side, the user packet transmission method provided in one or more embodiments of this application, and execute instructions included in the program. The interface 1902 may be configured to output an execution result of the processor 1901. In this application, the interface 1902 may be configured to output a resource allocation result of the processor 1901. For the user packet transmission method provided in one or more embodiments of this application, refer to the embodiment shown in FIG. 5, FIG. 8, FIG. 11, or FIG. 13. Details are not described herein again.

It should be noted that functions corresponding to the processor 1901 and the interface 1902 may be implemented by using a hardware design, may be implemented by using a software design, or may be implemented by combining software and hardware. This is not limited herein.

In another embodiment of this application, a communication system is further provided. The communication system includes a first access network device and a second access network device. Alternatively, the communication system includes a first access network device, a second access network device, and a terminal device. For example, the first access network device may be the access network device provided in FIG. 15 or FIG. 16, and is configured to perform operations performed by the access network device in the data processing methods provided in FIG. 5 to FIG. 12; and/or the terminal device may be the terminal device provided in FIG. 17 or FIG. 18, and is configured to perform operations performed by the terminal device in the data processing methods provided in FIG. 13 and FIG. 14.

In another embodiment of this application, a readable storage medium is further provided. The readable storage medium stores computer-executable instructions. When a device (which may be a single-chip microcomputer or a chip) or a processor invokes the computer-executable instructions stored in the readable storage medium, the operations performed by the first access network device or the terminal device in the data processing method provided in the embodiment shown in FIG. 5, FIG. 8, FIG. 11, or FIG. 13 are implemented. The foregoing readable storage medium may include: any medium that can store program code, such as a USB flash drive, a removable hard disk, a read-only memory, a random access memory, a magnetic disk, or an optical disc.

In another embodiment of this application, a computer program product is further provided. The computer program product includes computer-executable instructions, and the computer-executable instructions are stored in a computer-readable storage medium. At least one processor of a device may read the computer-executable instructions from the computer-readable storage medium, to implement the operations performed by the first access network device or the terminal device in the data processing method provided in the embodiment shown in FIG. 5, FIG. 8, FIG. 11, or FIG. 13.

In the specification, claims, and accompanying drawings of this application, the terms "first", "second", "third", "fourth" and the like are intended to distinguish between different objects but do not indicate a particular order. In addition, the terms "including", "having", and any other variant thereof, are intended to cover a non-exclusive inclusion. For example, a process, a method, a system, a product, or a device that includes a series of operations or units is not limited to the listed operations or units, but in an embodiment further includes an unlisted operation or unit, or further includes another inherent operation or unit of the process, the method, the product, or the device.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or the functions according to the embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state disk, SSD)), or the like.

Finally, it should be noted that the foregoing descriptions are merely specific implementations of this application, but the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. A data processing method, comprising:
   receiving, by a first access network device, a handover request message from a second access network device, wherein the handover request message is to request a terminal device to handover from a cell of the second access network device to a cell of the first access network device, wherein the handover request message comprises second indication information, the second indication information is used to indicate that the handover performed by the terminal device is handover with 0 ms interruption;
   determining, by the first access network device based on the second indication information, that a robust header compression (ROHC) restriction processing operation is to be performed, wherein the ROHC restriction processing operation comprises: performing no ROHC header compression, generating only initial and refresh (IR) packets, or performing the ROHC processing operation in an R mode; and
   receiving, by the first access network device, at least one packet from the second access network device, and performing the ROHC restriction processing operation on a second packet in the at least one packet.

2. The method according to claim 1, wherein the method further comprises:
   determining, by the first access network device, a third packet that is to be discarded in the at least one packet, wherein the third packet is a packet successfully received by the terminal device; and
   canceling, by the first access network device, the ROHC restriction processing operation after determining the third packet that is to be discarded.

3. The method according to claim 2, wherein after the canceling of the ROHC restriction processing operation, the method further comprises:
   performing, by the first access network device, the ROHC restriction processing operation on a packet in the at least one packet other than the second packet and the third packet.

4. The method according to claim 2, wherein before the determining that the third packet that is to be discarded in the at least one packet, the method further comprises:
   receiving, by the first access network device, a PDCP status report from the terminal device, wherein the PDCP status report is to indicate that the terminal device determines a successfully received packet or determines an unsuccessfully received packet; and
   wherein the determining that the third packet that is to be discarded in the at least one packet comprises:
   determining, by the first access network device based on the PDCP status report, the third packet that is to be discarded in the at least one packet.

5. The method according to claim 1, wherein the determining that the ROHC restriction processing operation is to be performed comprises:
   instructing, by a packet data convergence protocol (PDCP) protocol layer of the first access network device, an ROHC protocol layer to perform the ROHC restriction processing operation.

6. A communication apparatus, comprising:
   a processor;
   a memory coupled to the processor and storing program instructions, which, when executed by the processor, cause the processor to perform operations, the operations comprising:
   receiving a handover request message from a second access network device, wherein the handover request message is used to request a terminal device to handover from a cell of the second access network device to a cell of a first access network device, wherein the handover request message comprises second indication information, the second indication information is used to indicate that the handover performed by the terminal device is handover with 0 ms interruption;
   determining, based on the second indication information, that a robust header compression (ROHC) restriction processing operation is to be performed, wherein the ROHC restriction processing operation comprises: performing no ROHC header compression, generating only initial and refresh IR packets, or performing the ROHC processing operation in an R mode; and
   receiving at least one packet from the second access network device, and performing the ROHC restriction processing operation on a second packet in the at least one packet.

7. The apparatus according to claim 6, the operations further comprising:
   determining a third packet that is to be discarded in the at least one packet, wherein the third packet is a packet successfully received by the terminal device; and
   cancelling the ROHC restriction processing operation after determining the third packet that is to be discarded.

8. The apparatus according to claim 7, the operations further comprising:
   performing the ROHC restriction processing operation on a packet in the at least one packet other than the second packet and the third packet.

9. The apparatus according to claim 7, the operations further comprising:
   receiving a PDCP status report from the terminal device, wherein the PDCP status report is to indicate that the terminal device determines a successfully received packet or determines an unsuccessfully received packet; and
   determining, based on the PDCP status report, the third packet that is to be discarded in the at least one packet.

10. The apparatus according to claim 6, the operations further comprising:
    instructing, by a packet data convergence protocol (PDCP) protocol layer of the first access network device, an ROHC protocol layer to perform the ROHC restriction processing operation.

11. A non-transitory machine-readable medium, storing program instructions, which, when executed by a processor, cause the processor to perform operations, the operations comprising:
    receiving a handover request message from a second access network device, wherein the handover request message is used to request a terminal device to handover from a cell of the second access network device to a cell of a first access network device, wherein the handover request message comprises second indication information, the second indication information is used to indicate that the handover performed by the terminal device is handover with 0 ms interruption;

determining, based on the second indication information, that a robust header compression (ROHC) restriction processing operation is to be performed, wherein the ROHC restriction processing operation comprises: performing no ROHC header compression, generating only initial and refresh IR packets, or performing the ROHC processing operation in an R mode; and receiving at least one packet from the second access network device, and performing the ROHC restriction processing operation on a second packet in the at least one packet.

12. The machine-readable medium according to claim 11, wherein the operations further comprises:

determining a third packet that is to be discarded in the at least one packet, wherein the third packet is a packet successfully received by the terminal device; and cancelling the ROHC restriction processing operation after determining the third packet that is to be discarded.

13. The machine-readable medium according to claim 12, wherein the operations further comprises:

performing the ROHC restriction processing operation on a packet in the at least one packet other than the second packet and the third packet.

14. The machine-readable medium according to claim 12, wherein the operations further comprises:

receiving a PDCP status report from the terminal device, wherein the PDCP status report is to indicate that the terminal device determines a successfully received packet or determines an unsuccessfully received packet; and determining, based on the PDCP status report, the third packet that is to be discarded in the at least one packet.

15. The machine-readable medium according to claim 11, wherein the operations further comprises:

instructing, by a packet data convergence protocol (PDCP) protocol layer of the first access network device, an ROHC protocol layer to perform the ROHC restriction processing operation.

* * * * *